(12) United States Patent
Clark

(10) Patent No.: US 7,775,575 B2
(45) Date of Patent: Aug. 17, 2010

(54) POWER MANAGEMENT SYSTEM AND METHOD FOR PHOTOGRAPHIC WIRELESS COMMUNICATION

(75) Inventor: James E. Clark, South Burlington, VT (US)

(73) Assignee: Lab Partners Associates, Inc., South Burlington, VT (US)

( * ) Notice: Subject to any disclaimer, the term of this patent is extended or adjusted under 35 U.S.C. 154(b) by 257 days.

(21) Appl. No.: 12/129,447

(22) Filed: May 29, 2008

(65) Prior Publication Data

US 2008/0298792 A1  Dec. 4, 2008

Related U.S. Application Data

(60) Provisional application No. 60/940,694, filed on May 29, 2007, provisional application No. 61/030,558, filed on Feb. 21, 2008.

(51) Int. Cl.
  G03B 17/00  (2006.01)
(52) U.S. Cl. ............... 296/56; 396/189; 396/205; 348/371
(58) Field of Classification Search ......... 396/56–57, 396/169, 182, 189, 198, 205, 302; 348/370–371
  See application file for complete search history.

(56) References Cited

U.S. PATENT DOCUMENTS

| | | | |
|---|---|---|---|
| 3,039,375 A | 6/1962 | Umbach | |
| 3,185,056 A | 5/1965 | Gold et al. | |
| 4,470,804 A | 9/1984 | Geijer et al. | |
| 4,693,582 A | 9/1987 | Kawamura et al. | |
| 4,884,094 A | 11/1989 | Kitaura et al. | |
| 5,359,375 A | 10/1994 | Clark | |
| 5,640,623 A | 6/1997 | Sasaki | |
| 5,692,223 A | 11/1997 | Ichikawa et al. | |
| 6,088,542 A | 7/2000 | Yandi et al. | |
| 6,351,610 B1 | 2/2002 | Numako et al. | |
| 6,400,907 B1 * | 6/2002 | Izukawa | 396/301 |
| 6,404,987 B1 | 6/2002 | Fukui | |
| 6,430,369 B2 * | 8/2002 | Lee et al. | 396/87 |

(Continued)

FOREIGN PATENT DOCUMENTS

JP  2002244193 A  *  8/2002

(Continued)

OTHER PUBLICATIONS

Notification of Transmittal of the International Search Report and Written Opinion dated Sep. 25, 2008 in connection to related PCT Application Serial No. PCT/US2008/065137.

(Continued)

Primary Examiner—W .B . Perkey
Assistant Examiner—Leon W Rhodes
(74) Attorney, Agent, or Firm—Downs Rachlin Martin PLLC

(57) ABSTRACT

A system and method for setting the power operating condition of a photographic wireless communication device. An information representing a shutter speed of a camera body is detected from the camera body. A shutter speed of the camera body is determined from the information representing a shutter speed. The power operating condition of the photographic wireless communication device is automatically set based on the shutter speed of the camera body.

20 Claims, 16 Drawing Sheets

U.S. PATENT DOCUMENTS

| | | |
|---|---|---|
| 6,718,135 B2 | 4/2004 | Kawasaki et al. |
| 6,748,165 B2 | 6/2004 | Ogasawara |
| 6,778,764 B2 | 8/2004 | Barghini et al. |
| 6,798,986 B2 | 9/2004 | Hagiuda |
| 6,941,067 B2 | 9/2005 | Muramatsu |
| 7,035,534 B2 | 4/2006 | Shih et al. |
| 7,184,658 B2 | 2/2007 | Squillace |
| 2002/0009296 A1 | 1/2002 | Shaper et al. |
| 2004/0036774 A1 | 2/2004 | Nichols et al. |
| 2004/0101295 A1 | 5/2004 | Clark |
| 2006/0275024 A1 | 12/2006 | McNary |
| 2007/0070206 A1 | 3/2007 | Clark |
| 2007/0237510 A1 | 10/2007 | Clark |

FOREIGN PATENT DOCUMENTS

| | | |
|---|---|---|
| JP | 2007067870 A * | 3/2007 |

OTHER PUBLICATIONS

Notification of Transmittal of the International Search Report and Written Opinion dated Sep. 25, 2008 in connection to related PCT Application Serial No. PCT/US2008/065139.

* cited by examiner

POWER MANAGEMENT SYSTEM AND METHOD FOR PHOTOGRAPHIC WIRELESS COMMUNICATION

RELATED APPLICATION DATA

This application claims the benefit of priority of U.S. Provisional Patent Application Ser. No. 60/940,694, filed May 29, 2007, and titled "Power Management System and Method for Photographic Wireless Communication." This application also claims the benefit of priority of U.S. Provisional Patent Application Ser. No. 61/030,558, filed Feb. 21, 2008, and titled "Photographic Wireless Communication for Lighting Device Control. Each of these applications is incorporated by reference herein in its entirety.

This application is related to commonly-owned and copending U.S. patent application Ser. No. 12/129,402, filed by Applicant, James E. Clark, on May 29, 2008, and titled "System and Method for Maintaining Hot Shoe Communications Between a Camera and a Wireless Device."

FIELD OF THE INVENTION

The present invention generally relates to the field of photographic wireless communication. In particular, the present invention is directed to a power management system and method for photographic wireless communication.

BACKGROUND

Wireless communication devices may be used in conjunction with photographic equipment, such as for communicating a synchronization signal from a camera body to a remote flash device. The synchronization signal is utilized to cause the remote flash device to emit flash lighting at the same time as image acquisition by the camera body. Such wireless communications devices and their wireless communications circuitry, such as a transmitter, are typically powered by a battery source of power. These batteries may be large and add size and weight to the device, which can impact the strength of the mounting required to affix the device to the camera body. Additionally, the battery can be drained quickly of power when the wireless device is powered on, partly due to the high power requirements of some transmitter and receiver circuitry.

Attempts have been made to minimize power consumption in photographic wireless communication devices. One attempt involves placing the wireless communication circuitry in a sleep or hibernation mode after a predetermined time of inactivity of wireless synchronization or other transmission activity. In one such system, the transmitter of the device could be returned to a full operation mode by a user of the device actuating a button on the device.

An early photographic wireless device included a default start-up mode (i.e., a low speed mode) that kept the transmitter oscillator of the device in a non-enabled state until transmission was needed. If the photographer set the camera body to a shutter speed that he or she predicted was to fast for the low speed mode, the photographer could manually turn the device off and actuate a combination of buttons on the device to power the device back on in a high speed mode in which the oscillator remained in an enabled state. Such a device required the photographer to manually recognize that the shutter speed that he or she intended to use required the high speed mode of the device and, in addition to setting the shutter speed on the camera, taking the time to fully power down the wireless device and manipulate multiple buttons before the wireless device could trigger remote flash devices. Such a device likely would negatively impact a photographers ability to rapidly move from one photographing scenario to another where the shutter speed of the camera body changed.

SUMMARY OF THE DISCLOSURE

In one embodiment, a method of managing the power of a photographic wireless communications circuitry associated with a camera body, the camera body having an external connector that provides access to a synchronization signal of the camera body is provided. The method includes detecting a first shutter speed information from the external connector of the camera body that provides access to a synchronization signal and to the first shutter speed information from within the camera body, the first shutter speed information representing a shutter speed of the camera body; determining a shutter speed of the camera body from the first shutter speed information; and automatically setting a power operating condition of the photographic wireless communications circuitry based on the shutter speed.

In another embodiment, a method of managing the power of a photographic wireless communications circuitry associated with a camera body, the camera body having an external connector that provides access to a synchronization signal of the camera body is provided. The method including detecting a synchronization signal via an external connector of a camera body; determining a shutter speed of the camera body from a length of the duration of the synchronization signal; and automatically setting a power operating condition of the photographic wireless communications circuitry based on the shutter speed.

In yet another embodiment, a photographic wireless communication device for providing wireless communication capability to a camera body having an external connector that provides access to a synchronization signal of the camera body is provided. The photographic wireless communication device includes a wireless communications circuitry; a first connector configured to connect to an external connector of the camera body that provides access to a synchronization signal of the camera body; and a power operating condition control circuitry connected to the first connector and configured to receive from the first connector a first shutter speed information, the first shutter speed information representing a shutter speed of the camera body, said power operating condition control circuitry for determining a shutter speed of the camera body and automatically setting a power operating condition of the wireless communications circuitry based on the shutter speed.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
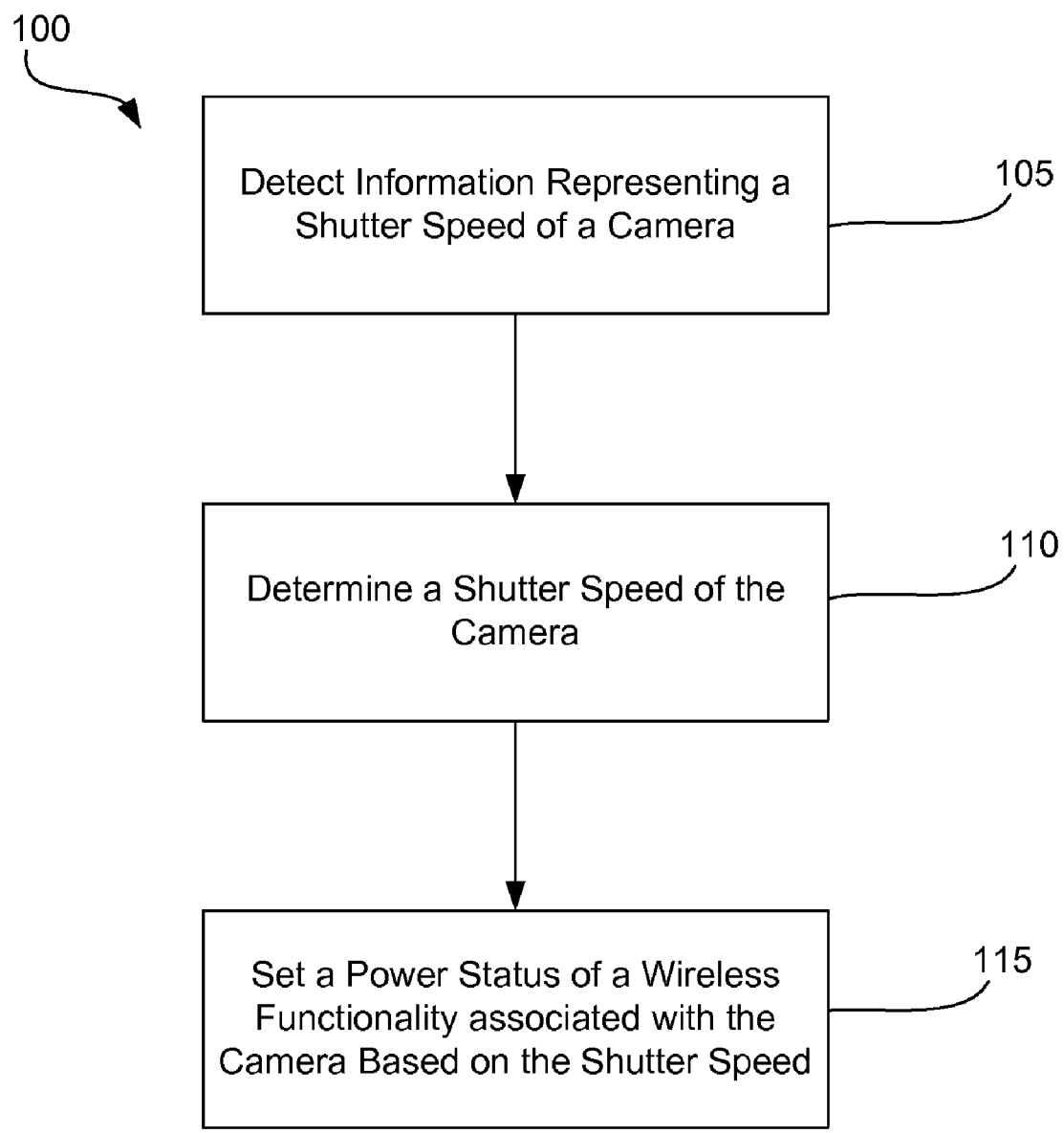
FIG. 1 illustrates one exemplary implementation of a method for setting a power operating condition of a wireless communication functionality.

FIG. 1 illustrates one implementation of a method 100 for setting a power status of a wireless communication functionality associated with a camera based on the shutter speed of the camera. At step 105, a wireless communication functionality receives (e.g., detects) information representing a shutter speed of an associated camera. Information representing a shutter speed of a camera may be any information (e.g., data) provided by the camera to a wireless communication functionality from which a shutter speed of the camera may be determined. A shutter speed is an indication relative to the time period for which a camera will acquire an image. For example, in a camera that includes an actual shutter mechanism a shutter speed may be related to the amount of time for which the shutter is open (e.g., the time for which light is allowed to pass to a film or other light sensitive material, such as a CCD in a digital camera). In another example, a shutter speed may be related to the amount of time in a camera without a shutter mechanism for which a light sensitive circuitry is active in image acquisition. Examples of information representing a shutter speed that may be received by a wireless communication functionality include, but are not limited to, a shutter speed data signal, a synchronization signal, a serial data signal, a magnetic pulse signal, a sound signal, and any combinations thereof.

A shutter speed data signal may be a serial communication signal carrying information that directly represents a shutter speed of a camera body. A shutter speed data signal may be encoded or implemented in a language that requires only that the encoding or language be read to determine the shutter speed carried on the serial data signal. Other ways of carrying a shutter speed data signal on a serial communication signal may also be used. In one example, a shutter speed data signal may be included in a serial peripheral interface ("SPI") serial data communication. Other serial protocols other than SPI may also be utilized.

A synchronization signal is a signal that is provided by a camera body to synchronize a device associated with the camera (e.g., a local and/or remote flash device) with image acquisition by the camera. This signal is provided by the camera via a synchronization connector of the camera (e.g., a synchronization connector of a hot shoe, a PC connector, other synchronization connector, etc.).

An information representing a shutter speed may be detected via a variety of connectors utilized to connect a wireless communication functionality to a camera body. Such connectors are discussed further below with respect to FIG. 2. In one example, an information representing a shutter speed is detected via a connector of a camera body that provides access to a synchronization signal. In one such example, a synchronization connector may include access to both information representing a shutter speed and a synchronization signal. A hot shoe connector may include one or more data contacts in addition to providing synchronization. Several examples of wireless communication functionalities are described below that utilize a synchronization connector that is a hot shoe connector. In other examples, a synchronization connector may only provide access to a synchronization signal. A shutter speed may be determined from a shutter speed data signal, a synchronization signal, or other signals provided by a synchronization connector (e.g., a synchronization connector having one or more data contacts).

Referring again to FIG. 1, at step 110, a shutter speed is determined based on the information representing a shutter speed that is received from the camera. In one example, this determination may involve a manipulation of information received (e.g., utilizing predetermined information correlating length of synchronization signal to shutter speed). An example implementation of determining a shutter speed of a camera body from a synchronization signal is discussed further below with respect to FIG. 8. In another example, the determination of a shutter speed involves interpreting a shutter speed signal provided by the camera (e.g., a serial peripheral interface ("SPI") related shutter speed signal). An example implementation of determining a shutter speed from a shutter speed data signal is discussed further below with respect to FIG. 11.

At step 115, a power status of the wireless communication functionality is automatically set based on the shutter speed of the camera. In one example, a power operating condition of a wireless communication circuit of a wireless communication functionality may be set to a relatively high operating condition when the shutter speed of the camera is determined to be a faster shutter speed. In another example, a power operating condition of a wireless communication circuit of a wireless communication functionality may be set to a relatively low operating condition when the shutter speed of the camera is determined to be a slower shutter speed. The threshold between what is considered a faster shutter speed and a slower shutter speed will depend on various factors related to an particular implementation. For example, these factors include, but are not limited to, one or more limitations of a remote device receiving information from the camera via the wireless communication functionality, the type of information to be transmitted from the camera by the wireless communication functionality, the time window in which a remote device must act on information in relation to the shutter speed, the amount of time required for the wireless communication circuitry to power up from a relatively low power state to a relatively high power state, the time required to wirelessly transmit the synchronization signal, the time required to receive the wireless signal and activate a remote lighting device, and any combinations thereof.

In one example, a remote device includes a flash device and the information to be wirelessly transmitted from the camera to the remote device includes a synchronization signal. In one such example, shutter speeds that would have image acquisition terminate prior to a remote flash device triggering if the wireless communication functionality were to have to power up to a higher power state (e.g., a state that would allow wireless transmission) would be considered faster shutter speeds. If the time to receive the synch signal, the time to power up the wireless communication functionality, the time to wirelessly transmit the signal to the remote flash device, and the time to fire the remote flash device allow for the flash to occur at the appropriate time related to image acquisition for a particular shutter speed, then such a shutter speed would be considered a slower shutter speed. Slower shutter speeds are below the threshold and faster shutter speeds are above the threshold. In one example, a threshold is set such that shutter speeds of $1/250^{th}$ of a second and slower are below the threshold and shutter speeds above $1/250^{th}$ of a second are above the threshold. In another example, a threshold is set such that shutter speeds of $1/125^{th}$ of a second and slower are below the threshold and shutter speeds above $1/125^{th}$ of a second are above the threshold. A higher shutter speed correlates to a shorter image acquisition period and a lower shutter speed correlates to a longer image acquisition period.

A wireless communication functionality may be configured with any number of power states. For example, a wireless communication functionality may include a full power state (e.g., where the wireless communication functionality is ready to transmit information upon receipt from the camera), a lowest power state (e.g., where the wireless communication functionality consumes little to no power), an intermediate power state (e.g., where an oscillator of a transmitter circuitry of a wireless communication functionality is powered down, but where the functionality can detect incoming information from the associated camera), and any combinations thereof. A wireless communication functionality takes a certain amount of time to change status from a lower power consumption state to a higher power consumption state. For purposes of discussion, this time period will be referred to as a power up time.

In one exemplary aspect, a determination of whether a shutter speed is above or below a particular threshold may include reference to a direct mapping of one or more shutter speeds to each available power operating condition (e.g., by storing information related to the mapping in a memory of a wireless communication functionality and utilizing a control circuitry to compare a shutter speed to the stored information). In such an example, the shutter speeds assigned to a higher power level above a threshold between the higher power level and the next lowest power level are determined to be above the threshold. The shutter speeds assigned to the next lowest power level are determined to be below the threshold.

With faster shutter speeds, the power status of a wireless communication functionality is usually set to a higher power state (e.g., such that the wireless communication functionality is ready to transmit upon receiving information from a camera). With slower shutter speeds, the power status of a wireless communication functionality can be set to a lower power state. One potential benefit of using a lower power state with slower shutter speeds is that a reduction of power consumption (e.g., conservation of battery power) can be achieved. Another potential benefit of automatically setting the power operation condition of a wireless communication circuitry based on information from a synchronization connector is that a user of the camera body may be able to move rapidly from one photographic condition to another without worrying about the power condition of the wireless communication functionality and the ability to have synchronization of a remote device occur with image acquisition.

Figure 2:
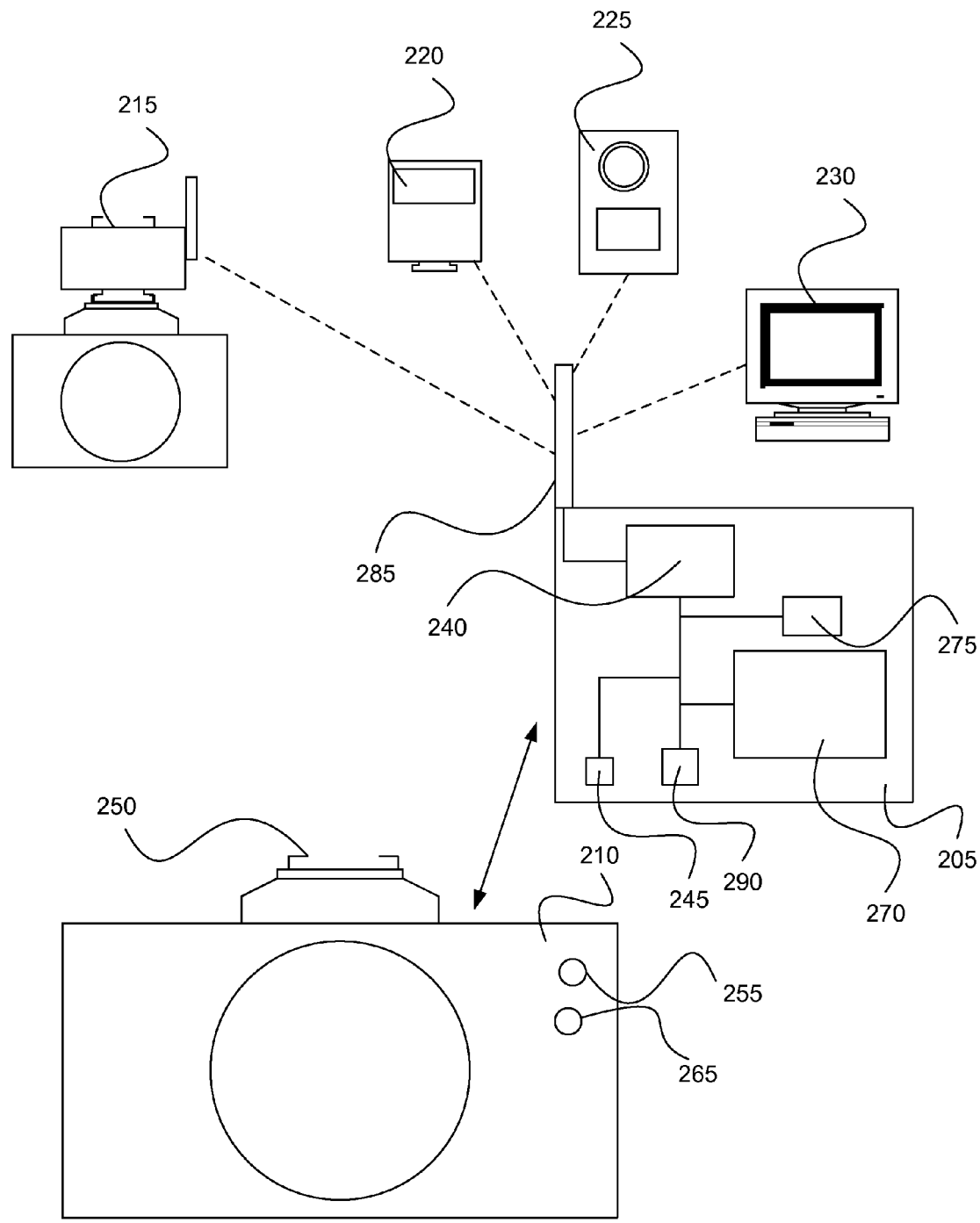
FIG. 2 illustrates one exemplary operating environment for a photographic wireless communication functionality.

FIG. 2 illustrates one exemplary implementation of a wireless communication functionality 205 associated with a camera body 210 for providing the camera body with an ability to communicate wirelessly with one or more remote devices 215, 220, 225, 230, 235. Wireless communication functionality 205 includes a wireless communication circuitry 240. Wireless communication functionality 205 can set a power operating condition of wireless communication circuitry 240 based on a shutter speed of camera body 210.

Wireless communication functionality 205 may detect (e.g., receive) an information representing a shutter speed from the camera via an electrical connection between electronics (not shown) of camera body 210 and electronics of wireless communication functionality 205. Wireless communication functionality 205 includes a connector 245 for connecting wireless communication functionality 205 to a circuitry of camera body 210 that provides an information related to shutter speed of camera body 210. In one aspect, connector 245 may associate wireless communication functionality 205 with camera body 210 such that wireless communication functionality 205 can wirelessly communicate a synchronization signal and/or other data from camera body 210 to one or more remote devices 215, 220, 225, 230, 235. Connector 245 may be configured (e.g., shaped and sized) to connect to one or more connectors of camera body 210. In one example, connector 245 may be sized and configured to mate and communicate with a connector of camera body 210 that provides access to a synchronization connector of camera body 210. Examples of connectors of camera body 210 for connection with connector 245 include, but are not limited to, a hot shoe connector, another synchronization connector providing access to a synchronization signal of camera body 210 (e.g., a PC synchronization connector), a direct wired connection of electronics of camera body 210 with wireless communication functionality 205 (e.g., where wireless communication functionality 205 is internal to camera body 210), a motor drive connector, a flexible printed circuit board connector, and any combinations thereof. Examples of a configuration for connector 245 include, but are not limited to, a hot shoe connector, another synchronization connector (e.g., a PC synchronization connector), a direct wiring connection, a motor drive connector, and any combinations thereof. In one example, connector 245 is configured to directly connect to an external connector of camera body 210. In another example, connector 245 is configured to connect to an external connector of camera body 210 via an extension cable or other extension device.

Camera body 210 is shown for exemplary purposes with a hot shoe connector 250, a PC connector 255, and another external connector 265 (e.g., a motor-drive connector). A camera body, such as camera body 210, may include any number of external connectors.

A hot shoe connector is a connector in the photographic field typically utilized for attaching a flash device or other accessory to a camera body. In one example, a hot shoe connector may be a female connector (sometimes referred to as a "boot" or "shoe") configured to mate with a corresponding male hot shoe connector (sometimes referred to as a "foot"). In another example, a hot shoe connector may be a male hot shoe connector. Hot shoe connectors may have varying physical dimensions. In one example, a hot shoe connector is a standardized hot shoe connector having dimensions based on a standard definition set by the International Organization for Standardization (e.g., ISO standard 518: 2006). Certain camera bodies produced by Nikon and Canon utilize a standard dimensioned hot shoe connector. Certain camera bodies produced by Minolta utilize a hot shoe connector having dimensions that are not standardized (e.g., proprietary to Minolta). A hot shoe connector typically includes a flash synchronization contact (e.g., positioned in the center of the hot shoe connector). This flash synchronization contact may be standardized across manufacturers. A flash synchronization contact of a hot shoe connector typically provides a voltage low signal (or pulled low signal) to indicate a synchronization signal. A hot shoe connector may also include one or more additional contacts utilized for communicating other data (e.g., information about the camera, information about a flash device). For example, certain Nikon camera bodies include three additional data contacts (e.g., one contact for data in/out of the camera, and one contact for clock signal). In another example, certain Canon camera bodies include four additional data contacts (e.g., one contact for data into the camera body, one contact for data out from the camera body, one contact for clock signal, one contact for wakeup/autofocus assist information). Exemplary hot shoe connector configurations are illustrated below in with FIGS. 4A and 4B. Connector 245 may be configured to mate with hot shoe connector 250 (e.g., directly, via an extension cable, etc.) and the synchronization and data contacts of hot shoe connector 250. In one example, connector 245 is shaped and sized to mate with hot shoe connector 250 and detect a synchronization signal and a shutter speed data signal from hot shoe connector 250.

A PC connector is a synchronization connector known in the photographic arts. When used herein in the context of a PC connector (e.g. PC connector 255), the term "PC" does not refer to a personal computer. The term PC connector is understood in the photographic arts to represent a specific type of camera synchronization signal connector. Connector 245 may be configured to mate with PC connector 255 (e.g., directly, via an extension cable, etc.). In one example, connector 245 is shaped and sized to mate with PC connector 255 and detect a synchronization signal electrically communicated via PC connector 255.

Information related to a shutter speed detected via connector 245 from camera body 210 may be communicated to a control circuitry 270 of wireless communication functionality 205. Control circuitry 270 may include one or more circuit elements for determining a shutter speed of camera body 210 from information related to a shutter speed received via connector 245. Examples of circuit elements for control circuitry 270 include, but are not limited to, a processor, a memory, a timer capture, a timer compare, and any combinations thereof. Wireless communications functionality 205 is illustrated with a memory 275 separate from control circuitry 270. In another example, memory 275 may be part of control circuitry 270 (e.g., as on-chip memory associated with a processor). Example processors include, but are not limited to Atmel ATmega168, AT90USB1287, CC1110, and any combinations thereof. In one example, a processor with built in wireless capability model CC1110 available from Texas Instruments may be utilized. Memory 275 is in electrical communication with control circuitry 270. Memory 275 may include, for example, machine executable instructions that may be executed by processor 270 in operating wireless communication functionality 205, data related to the transfer of information wirelessly to and/or from wireless communication functionality 205, data related to a correlation between a length of a synchronization signal and a corresponding shutter speed, machine executable instructions for execution by control circuitry 270 to implement any of the functions and aspects of power management described herein, and any combinations thereof.

Wireless communication functionality 205 includes wireless communication circuitry 240 electrically connected to an antenna 285 for wirelessly communicating information (e.g., synchronization signal, other data, etc.) to and/or from wireless communication functionality 205. Wireless communication circuitry 240 may include one or more circuit elements. Various wireless communication circuit elements are well recognized. Example wireless communication circuit elements include, but are not limited to, a transmitter, a receiver, a transceiver, and any combinations thereof. In one example, wireless communication circuitry 240 includes a transceiver. Wireless communication circuitry 240 and control circuitry 270 are shown as separate elements. In an alternative implementation, one or more components of wireless communications circuitry 240 and control circuitry 270 may be may be part of a combined circuit package (e.g., a single integrated circuit element). In one example, wireless communications circuitry 240 may include a transceiver and processor circuitry (e.g., a ChipCon CC1110 CPU/transceiver combination circuit element). It is also contemplated that one or more elements of control circuitry 270 may be shared with control circuitry of camera body 210 (e.g., where wireless communication functionality 205 is internal to camera body 210).

Antenna 285 is shown as having an external component to wireless communication functionality 205. In another example, antenna 285 may be configured completely within wireless communication functionality 205, configured to be removable from wireless communication functionality 205, configured to be adjustable with respect to its position relative to the body of wireless communication functionality 205, configured to be retractable (e.g., in length), and any combinations thereof.

Wireless communication functionality 205 also includes a power supply 290. Power supply 290 may be any power supply capable of providing power to wireless communication functionality 205 (e.g., including to wireless communication circuitry 270). Example power supplies include, but are not limited to, a battery, a connection to a standard household-type power supply (e.g., a 110-volt household outlet and adapter), a connection to a power supply internal to camera body 210, a power storage circuit element (e.g., a capacitor), and any combinations thereof. Power supply 290 is shown as internal to the wireless communication functionality 205. In another example, power supply 290 is external to wireless communication functionality 205 (e.g., with a wired connection to the internal circuitry of wireless communication functionality 205). In yet another example, power supply 290 may be a power supply of camera 210 (e.g., when wireless communication functionality 205 is internal to camera body 210).

In one exemplary aspect, a shutter speed of a camera body may be determined from information related to a shutter speed detected via connector 245 using one or more elements of control circuitry 270, memory 275, and any combinations thereof. In another exemplary aspect, a power operating condition of wireless communication circuitry 285 may be set based on the shutter speed of camera body 210 using one or more elements of control circuitry 270, memory 275, power supply 290, wireless communication circuitry 285, and any combinations thereof.

Wireless communication functionality 205 may also include an optional visual display or other indicator for displaying information about a status or operation of wireless communication functionality 205. Examples of a visual display or indicator include, but are not limited to, a liquid crystal display (LCD), a light emitting diode (LED), and any combinations thereof. Additionally, wireless communication functionality 205 may optionally include one or more data input controls for inputting data to wireless communication functionality 205. Examples of a data input include, but are not limited to, a universal serial bus (USB) port, a button, a touch sensitive screen, a navigation toggle, and any combinations thereof. In one example, a user of wireless communication functionality 205 may input a model indicator for a camera connected to wireless communication functionality 205 via one or more data input controls and/or a visual display. The model indicator for the camera may be stored in memory 525 and/or otherwise used in determining a shutter speed of the camera. Wireless communication functionality 205 may include an optional manual power control for setting a power state of wireless communication functionality 205. Such a manual power control may be used to override automatic power state settings provided as described herein. Example manual power controls include, but are not limited to, a button, a toggle, a touch sensitive display screen, dial, a switch, and any combinations thereof. Wireless communication functionality 205 may include an optional second hot shoe connector. An exemplary implementation of a wireless communication functionality 205 having a second hot shoe connector is described further below with respect to FIG. 14. In one such example, control circuitry 270 may be configured to intercept information for use in determining a shutter speed of a camera body and/or for transmitting to a remote device.

As discussed above, FIG. 2 illustrates remote devices 215, 220, 225, 230, 235. Remote device 215 is illustrated as an exemplary remote camera. Remote device 220 is illustrated as an exemplary remote flash light device. Remote device 225 is illustrated as an exemplary remote light meter (e.g., a light intensity meter, a color meter, etc.). Remote device 230 is illustrated as an exemplary computing device. Remote device 235 is illustrated as an exemplary hand-held computing device. Wireless communication functionality 205 may communicate a synchronization signal and/or one or more data to and/or from one or more remote devices (including one or more of remote devices 215, 220, 225, 230, 235). In one example, information communicated to and/or from a remote device may be utilized to remotely control the operation of the remote device. Examples of a remote device include, but are not limited to, a remote lighting device (e.g., a continuous lighting device, a flash lighting device), a remote light meter (e.g., a color meter, a full-spectrum light meter), a remote camera, a remote computing device (e.g., a general purpose computer, a laptop computer, a desktop computer, a handheld computer, a personal data assistant, a mobile communication device), and any combinations thereof.

As discussed above, a shutter speed of a camera body can be determined from an information related to shutter speed that is detected from a camera body via one or more connections between a wireless communication functionality and the circuitry of the camera body. In one example, an information related to a shutter speed of a camera body is detected via an external connector of a camera body that provides access to a synchronization signal of a camera body and to information related to a shutter speed. Information related to a shutter speed may have a variety of forms. In one example, information related to a shutter speed is a shutter speed data. In another example, information related to a shutter speed is a synchronization signal. In such an example, a shutter speed may be determined from the length of duration of the synchronization signal.

Figure 7:
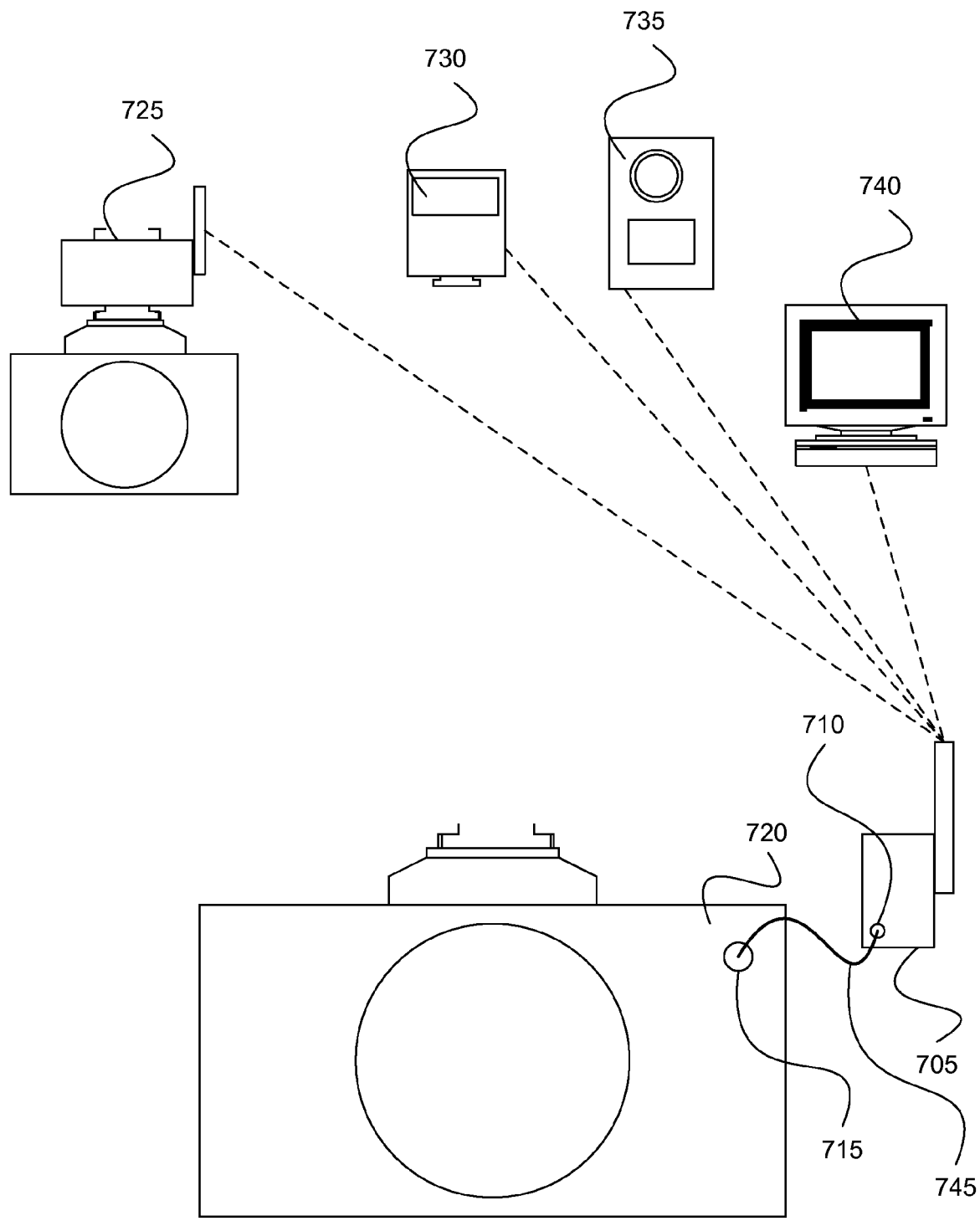
FIG. 7 illustrates yet another example of a wireless communication functionality.
Figure 8:
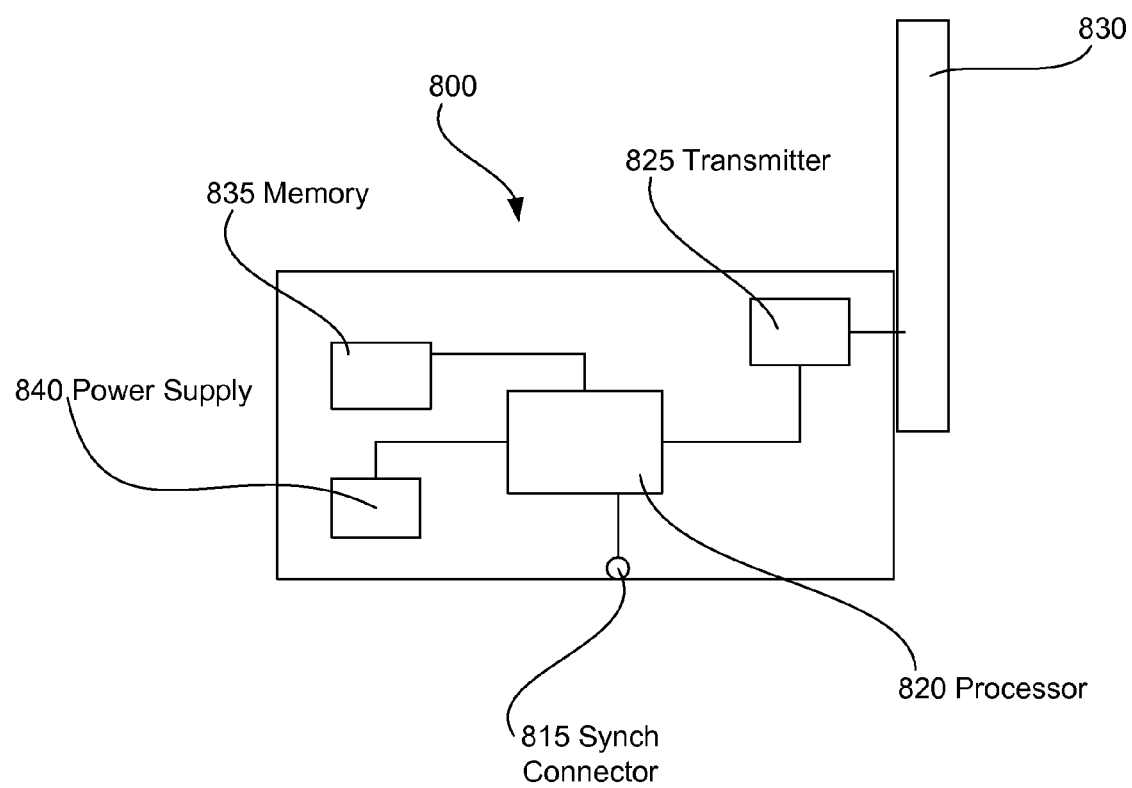
FIG. 8 illustrates one example of a wireless communication functionality with a synchronization contact.
Figure 10:
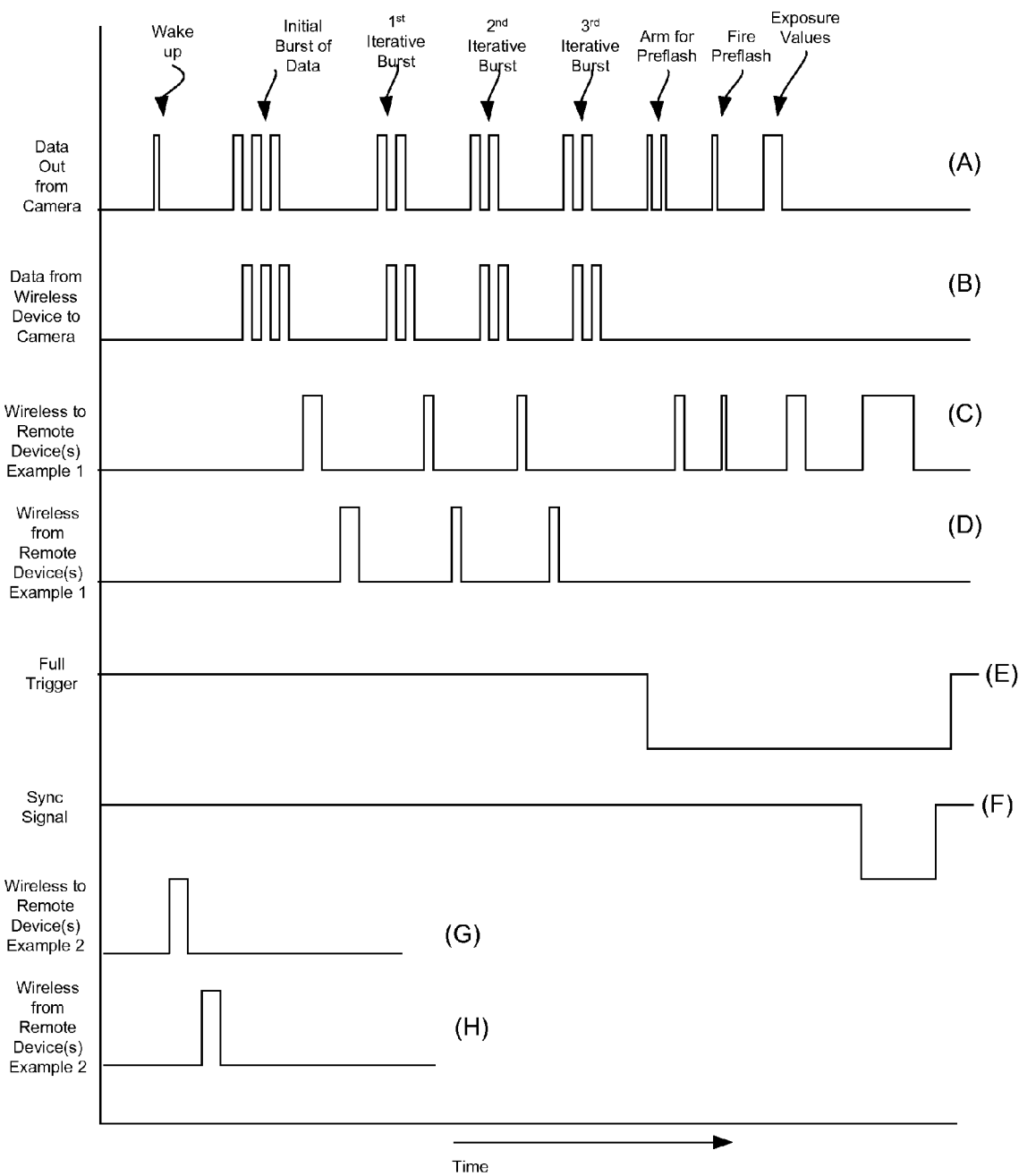
FIG. 10 illustrates exemplary timing plots.

A hot shoe connection between a camera body and a wireless communication device may provide access to a synchronization signal and information representing a shutter speed (e.g., as the synchronization signal itself providing an indication of shutter speed by the length of the synchronization signal and/or by providing shutter speed data signal). Other synchronization connectors (e.g., a PC synchronization connector) may only provide a synchronization signal from which a shutter speed can be determined. FIGS. 3 to 6 below illustrate exemplary implementations of wireless communication functionalities that connect with a camera body via a hot shoe connector. FIGS. 7 and 8 show exemplary implementations of wireless communication functionalities that connect with a camera body via another synchronization connector (e.g., a PC connector). FIG. 10 illustrates exemplary aspects of one method of determining a shutter speed from a synchronization signal.

A shutter speed data signal may be included in a serial communication carried on one or more data contacts of an external connector of a camera body. In one example, a shutter speed data signal is included in a serial communication carried on one or more data contacts of a hot shoe connector. As discussed above, a hot shoe connector also provides access to a synchronization signal of the camera body. The following discussion refers to a serial connection example of a hot shoe connector (e.g., a connector 245 of wireless communication functionality 205 of FIG. 2) of a wireless communication functionality as a conduit for detecting one or more serial data, including a shutter speed data signal. Other serial connections of a camera body are also contemplated as a replacement and/or supplement to a hot shoe connector.

One or more of the data contacts (e.g., the additional contacts that are not the center synchronization contact) of a hot shoe connector may utilize a serial protocol of communication. In one example, one or more of the data contacts of a hot shoe connector may make up a serial peripheral interface ("SPI"). Camera and flash data communicated over (e.g., communicated/detected from the camera over one or more data contacts of a hot shoe connector, communicated into the camera from a wireless communication functionality via one or more data contacts of a hot shoe connector) the one or more data contacts of a hot shoe connector may be referred to herein as SPI data. It is contemplated that where the term SPI data is utilized herein that other protocols of hot shoe connector data communication may be applied in addition to (or in place of) an SPI protocol. It is also contemplated that asynchronous data communication (e.g., without clock) may be used. Additionally, it is noted that differing camera manufacturers may utilize different command and/or data structures within an SPI data construct. Discussion herein of camera data, flash data, and SPI data contemplates that appropriate adjustments may be taken in programming and configuration to accommodate variances based on protocol and manufacturer specific command and/or data structures.

Examples of camera data that may be communicated via one or more data contacts of a hot shoe connector include, but are not limited to, a camera/film ISO (gain), a shutter speed, an aperture, an exposure compensation value (e.g., a flash exposure compensation value, a camera exposure compensation value), zoom distance, focus distance, exposure value, mode of operation, model compatibility, protocol revision data, auto-flash mode indication, a distance from the camera to a subject, a zoom factor, an indication that pre-flash is not used during auto-mode, and any combinations thereof. The use of the term "ISO" data and/or value in reference to camera and/or flash data herein is meant to represent a standard way of measuring the sensitivity of film (in film photography) and the sensitivity of a sensor (in digital photography). Such a sensitivity may also be referred to as a gain. In one example, ISO/gain sensitivity data represents a sensitivity value based on ISO standard 5800:1987. In another example, ISO/gain sensitivity data represents a sensitivity value based on ISO standard 12232:2006.

Data communicated via a hot shoe connector of a camera body to a wireless communication functionality associated therewith may be wirelessly communicated to one or more remote devices (e.g., for controlling one or more remote devices). Data from one or more remote flash devices may also be communicated wirelessly to a wireless communication functionality associated with a camera body. The data from the one or more remote flash devices may be communicated from the wireless communication functionality to the camera body via the hot shoe connector.

Examples of flash data that may be communicated via a one or more data contacts of a hot shoe connector (e.g., from a remote flash device to a wireless communication device, from a wireless communication device to a camera body) include, but are not limited to, a flash readiness data, a flash tilt indicator (e.g., flash head tilted, flash head not tilted), remote flash zone setting value, model compatibility, remote/local mode(s), a flash zoom value (e.g., flash zoom quantitative value, flash zoom movement complete/not complete value), protocol revision data, a TTL mode, an indication of flash model, and any combinations thereof. In one example, flash data is communicated via a hot shoe connector from a flash device to a wireless communication device connected thereto (e.g., directly, with an extension cord). In another example, flash data is communicated via a connector other than a hot shoe connector from a flash device to a wireless communication device (e.g., wireless communication device 125). In yet another example, flash data is communicated via a hot shoe connector from a wireless communication device to a camera body.

Data communicated over an external serial communication connector of a camera body (e.g., a hot shoe connector) may be part of a data communication related to a through-the-lens ("TTL") flash lighting control operation. Various versions of TTL lighting control may be utilized. Example TTL lighting control protocols include, but are not limited to, A-TTL (advanced TTL), E-TTL (evaluative TTL), E-TTL II, i-TTL (a Nikon variant), D-TTL (another Nikon variant), and any combinations thereof (verify combinations).

Figure 3:
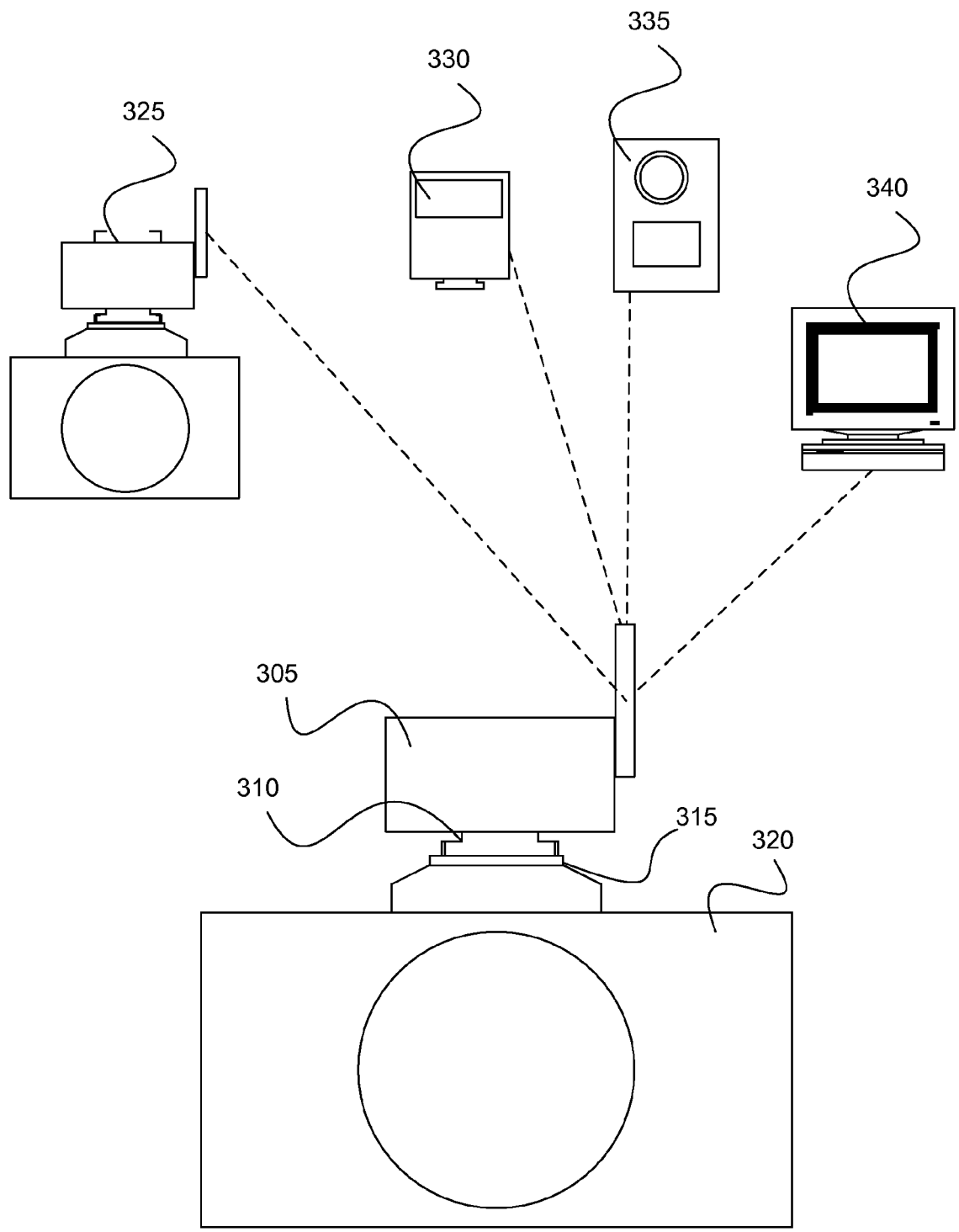
FIG. 3 illustrates one example of a wireless communication functionality with a hot shoe connector.

FIG. 3 illustrates one exemplary implementation of a wireless communication functionality 305 having a hot shoe connector 310 for connecting to a hot shoe connector 315 of a camera body 320. Hot shoe connector 315 provides hot shoe connector 310 and wireless communication functionality 305 access to a synchronization signal and an information related to a shutter speed (e.g., a shutter speed data signal) of camera body 320. In one example, wireless communication functionality 305 may detect a synchronization signal via hot shoe connectors 310 and 315, and wirelessly communicate the synchronization signal to one or more remote cameras 325, one or more remote flash devices 330, one or more remote light meters 335, one or more remote computing devices 340, and any combinations thereof. In another example, wireless communication functionality 305 may detect an information related to a shutter speed via hot shoe connectors 310 and 315, determine a shutter speed of camera body 320 from the information related to a shutter speed, and set a power operating condition of wireless communication functionality 305 based on the shutter speed determined via the connection with camera 320 that provides both synchronization signal and an indication of shutter speed.

The information related to a shutter speed may, in one example, be a shutter speed data (e.g., communicated via one or more data contacts of the hot shoe connectors 310 and 315). In another example, the information related to a shutter speed may be embodied in the synchronization signal detected via the hot shoe connectors 310 and 315. Exemplary determination of a shutter speed from a length of duration of a synchronization signal is discussed further below with respect to FIG. 10.

Figure 4A:
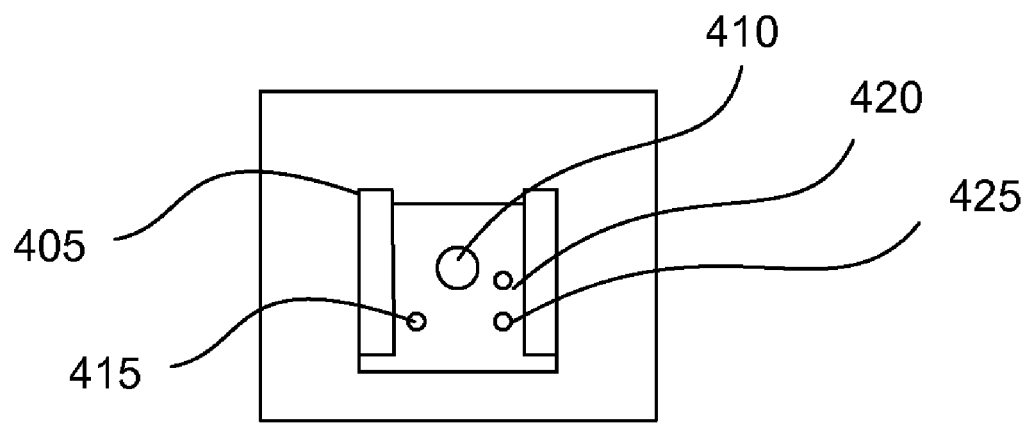
FIG. 4 illustrates examples of a hot shoe connector.
Figure 4B:
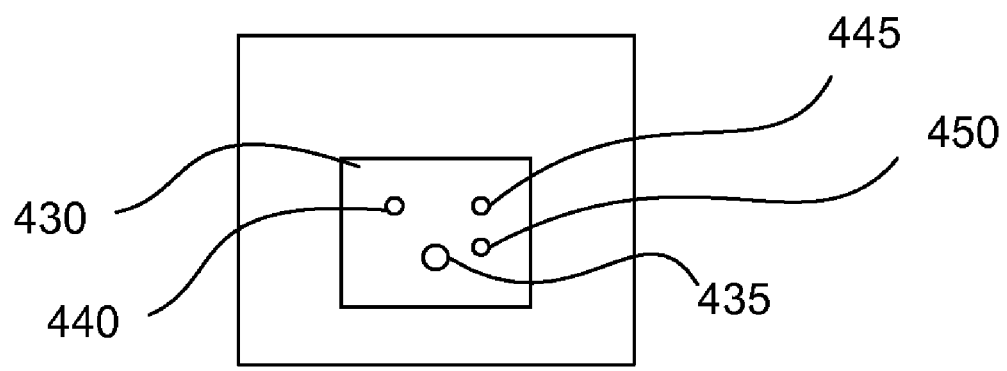

Hot shoe synchronization connectors come in a variety of configurations. A hot shoe synchronization connector may include a synchronization contact and/or one or more data contacts. FIG. 4A illustrates a top view of an exemplary female configuration of a hot shoe connector 405. Hot shoe connector 405 includes a synchronization contact 410 and data contacts 415, 420, 425. FIG. 4B illustrates a bottom view of an exemplary male configuration of a hot shoe connector 430. Hot shoe connector 430 includes a synchronization contact 435 and data contacts 440, 445, 450. In one example, hot shoe connector 405 may be an external connector of a camera body and hot shoe connector 430 may be a connector of a wireless communication functionality. In this example, hot shoe connector 405 may be mated with hot shoe connector 430 to connect synchronization connectors 410 and 435, connect data contacts 415 and 440, connect data contacts 420 and 445, and connect data contacts 425 and 450. These connections provide the wireless communication functionality with access to information related to a shutter speed (e.g., via synchronization connectors 410, 435 and/or via one or more data contact connections 415/440, 425/445, 420/450) and/or a synchronization signal (e.g., via synchronization connectors 410, 435).

Figure 5:
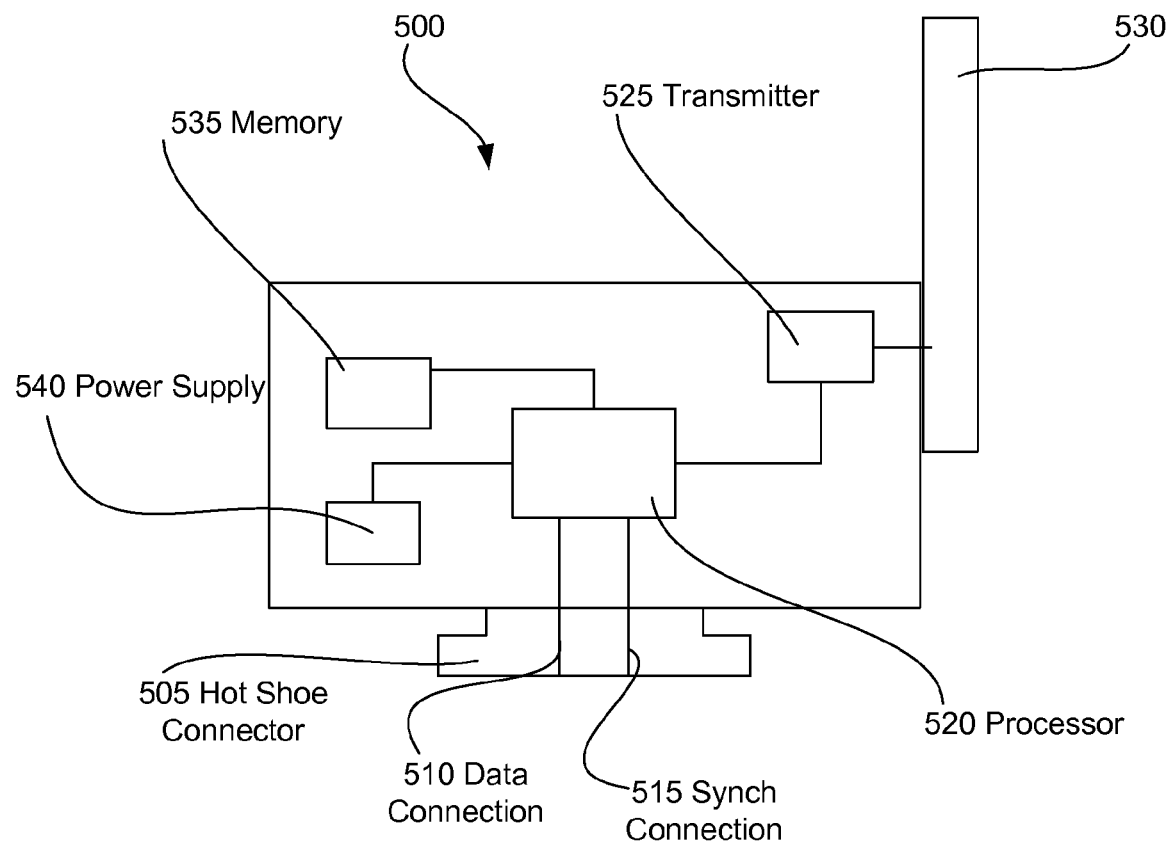
FIG. 5 illustrates one example of a wireless communication functionality having a synchronization connection and a data connection.

FIG. 5 illustrates another exemplary implementation of a wireless communication functionality 500. Aspects of wireless communication functionality 500 are similar to the aspects of wireless communication functionality 205 discusses above with respect to FIG. 2, except as discussed below. Wireless communication functionality 500 includes a hot shoe connector 505 including one or more data connections 510 and a synchronization connector 515. One or more data connections 510 and synchronization connector 515 are electrically connected to a processor 520. Wireless communication functionality 500 also includes a transmitter 525 and an antenna 530. In one alternative example, transmitter 525 may also include a receiver circuitry and/or transmitter 525 may be a transceiver circuitry. A memory 535 is electrically connected to processor 520. Wireless communication module 505 also includes a power supply 540.

In an exemplary operation of wireless communication functionality 500, hot shoe connector 505 is connected to a hot shoe connector of a camera. The camera electrically communicates an information representing a shutter speed of the camera via its hot shoe. Data connection 510 and/or synchronization connection 515 detect the information representing a shutter speed and electrically communicate the information to processor 520. In an example where the information representing a shutter speed includes shutter speed data, processor 520 may access instructions in memory 535 for interpreting the format of the shutter speed data to determine the shutter speed of the camera. Processor 520 may utilize information stored in memory 535 to determine if the shutter speed of the camera is above or below a certain threshold. Processor 520 may then set a power state of wireless communication functionality 500 appropriately. In an example where the information representing a shutter speed includes a synchronization signal, processor 520 may measure the length of the synch signal (e.g., in milliseconds) and access information stored in memory 535 for correlating the length to a shutter speed for the camera attached to wireless communication functionality 500. Processor 520 may utilize information stored in memory 535 to determine if the shutter speed of the camera is above or below a certain threshold. Processor 520 may then set a power state of wireless communication functionality 500 appropriately.

Figure 6:
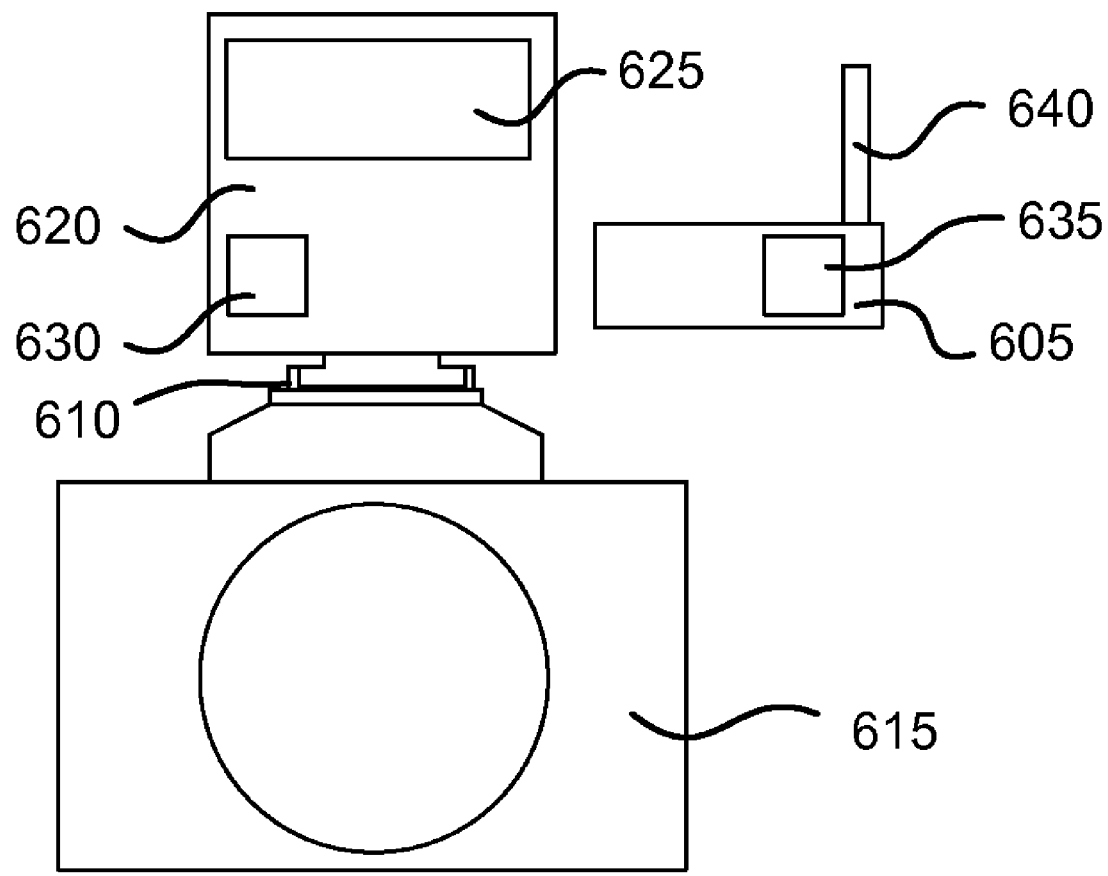
FIG. 6 illustrates another example of a wireless communication functionality.

FIG. 6 illustrates yet another implementation of a hot shoe based wireless communication functionality 605 that is associated with a hot shoe 610 of a camera body 615 via a flash device 620 mounted in hot shoe 610. Flash device 620 includes a visible light emission element 625 and an optical (e.g., infrared) light emission element 630 configured for wireless communication. Such optical wireless communication elements are known. Wireless communication functionality 605 is positioned proximate flash device 620 and includes an optical light (e.g., infrared) detection element 635, a wireless communication circuitry (not shown), a control circuitry (not shown), and an antenna 640. An optical detection element may be any optical sensor (e.g., visible sensor, IR sensor) configured to detect an optical signal from a camera body and/or a device associated with a camera body (e.g., a flash device inserted in a hot shoe of a camera body and light emission from an IR or visible light emission element).

In one exemplary implementation, camera body 615 may communicate a synchronization signal and/or information related to a shutter speed via hot shoe connector 610 to flash device 620. Flash device 620 emits light via light emission element 625 and/or optical emission element 630 representing the synchronization information and/or information related to a shutter speed (e.g. via pulses of light). In one example, an optical emission of a TTL flat light emission mode indication by flash device 620 may be utilized as information related to a shutter speed. Optical sensor 635 detects the optical information and circuitry of wireless communication functionality 605 processes the information. Part or all of the information may then be transmitted wirelessly via radio frequency utilizing transmission circuitry and antenna 640 to one or more remote devices. Additionally, control circuitry of wireless communication functionality 605 may utilize the information representing or associated with a shutter speed to determine a shutter speed of camera body 615 and set a power operation level of communication functionality 605 based on the shutter speed.

FIG. 7 illustrates yet another exemplary implementation of a wireless communication functionality 705 having a synchronization connector 710 for connecting to a synchronization connector 715 of a camera body 720. In one example, synchronization connectors 710 and 715 may be corresponding PC synchronization connectors configured to mate with each other. Synchronization connector 715 provides synchronization connector 710 and wireless communication functionality 705 access to a synchronization signal and an information related to a shutter speed (e.g., a shutter speed data signal) of camera body 720. In one example, wireless communication functionality 705 may detect a synchronization signal via synchronization connectors 710 and 715, and wirelessly communicate the synchronization signal to one or more remote cameras 725, one or more remote flash devices 730, one or more remote light meters 735, one or more remote computing devices 740, and any combinations thereof. In another example, wireless communication functionality 705 may detect an information related to a shutter speed via synchronization connectors 710 and 715, determine a shutter speed of camera body 720 from the information related to a shutter speed, and set a power operating condition of wireless communication functionality 705 based on the shutter speed determined via the connection with camera 720 that provides both synchronization signal and an indication of shutter speed. Wireless communication functionality 705 is shown with synchronization connector 710 connected to synchronization connector 715 via a wired connection 745. In another example, synchronization connector 710 of wireless communication functionality 705 may be directly connected to synchronization connector 715.

FIG. 8 illustrates still another embodiment of a wireless communication functionality 800 configured to automatically manage power based on a shutter speed of a camera body. Wireless communication functionality 800 includes a synchronization connector 815. Synchronization connector 815 is electrically connected to a processor 820 for providing a synch signal to processor 820. Wireless communication functionality 800 also includes a transmitter 825 and an antenna 830. In one alternative example, transmitter 825 may also include a receiver circuitry and/or transmitter 825 may be a transceiver circuitry. A memory 835 is electrically connected to processor 820. Wireless communication module 800 also includes a power supply 840. Synchronization connector 830 may be connected to a synchronization connector (e.g., a PC connector) of a camera body. In one example, this connection may be a direct connection of synchronization connector 830 to the synchronization connector of the camera (e.g., synchronization connector 830 is configured as a male PC connector to be connected to a female PC connector of the camera). In another example, this connection may be made by a wire between synchronization connector 830 and the synchronization connector of the camera. Synchronization connector 830 may have any suitable configuration for allowing connection to a synchronization connector of a camera. Example configurations for synchronization connector 830 include, but are not limited to, a $\frac{1}{8}^{th}$ inch female mini plug, a male PC connector, a female PC connector, and any combinations thereof. The camera sends a synchronization signal via the PC connector to synchronization connector 815 and on to processor 820. Processor 820 utilizes the synch signal to set a power state of module 800.

Some cameras may require that the electronics of the camera receive a signal from a device connected to a hot shoe of the camera body that indicates the presence of the device prior to the camera body sending certain information (e.g., serial data, shutter speed data, data associated with TTL flash control) via the hot shoe connector of the camera body. For example, some TTL capable cameras require a TTL capable flash device to be connected to the hot shoe prior to sending TTL data via the hot shoe. In one implementation, a wireless communication functionality (e.g., functionality 500 of FIG. 5) may be configured to send information over one or more connectors of a hot shoe connector that mimics information that a TTL capable flash device would transmit to the camera. For example, a processor of a wireless communication module may be configured (e.g., in correlation with instructions and/or information stored in a memory) to send a data signal similar to that sent by a TTL capable flash device to the electronics of the camera via one or more of the electrical connectors of a hot shoe connector to which the module is connected to the camera. In another example, the module may provide a current signal via one or more of the hot shoe connectors to indicate presence of an external device. In another implementation, a control circuitry and other circuitry of a wireless communication module of the present disclosure may be configured to communicate via one or more electrical connections to a camera body connected to a corresponding hot shoe of the wireless functionality that a particular type of accessory device is connected (e.g., a flash device) even when such a device is not directly connected to a hot shoe of the module. In one example, this "mock" accessory indication will allow the camera body to send SPI information (e.g., flash data, camera data, a shutter speed data, other information representing a shutter speed) to the wireless module for communication to a remote device.

Figure 9:
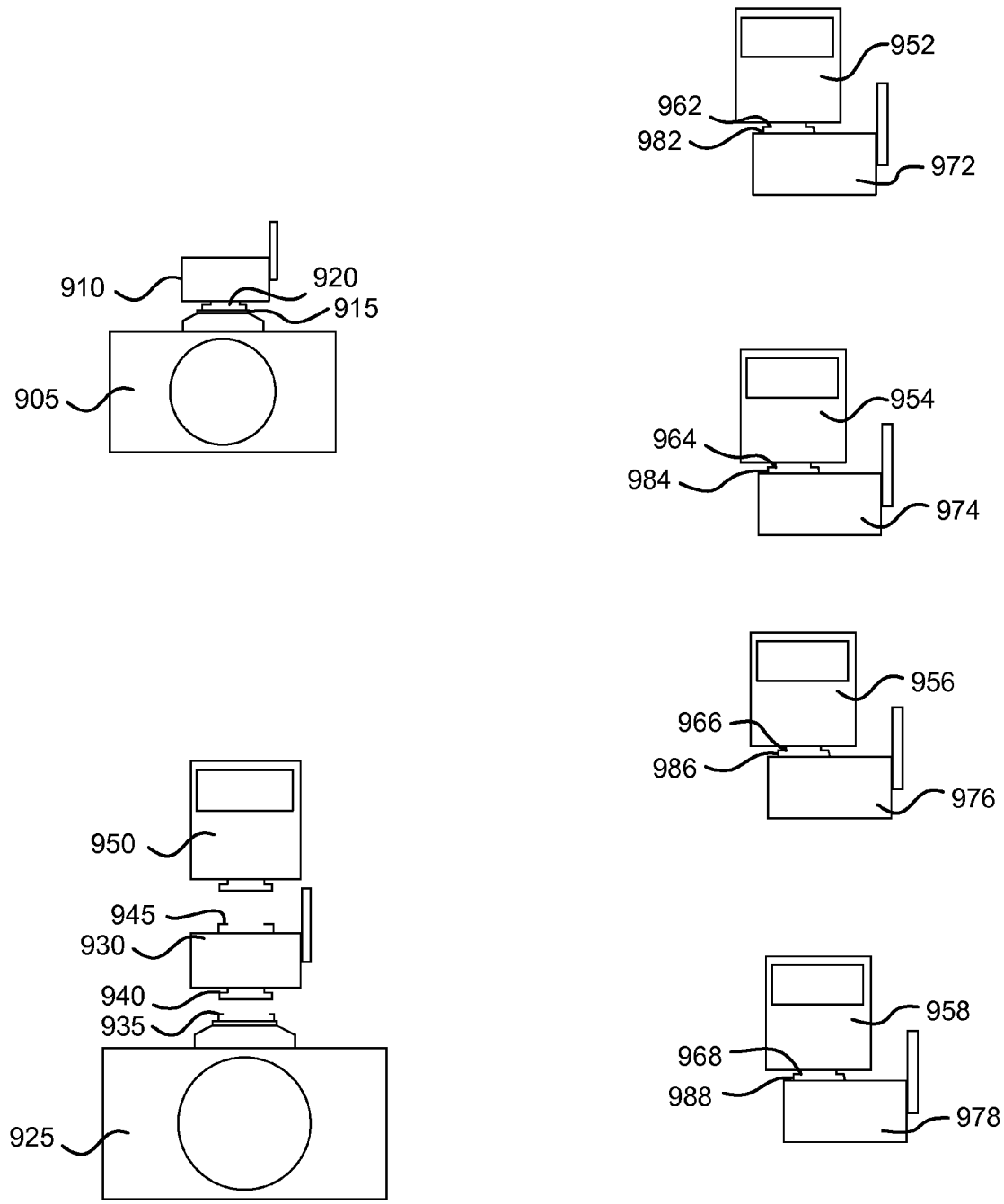
FIG. 9 illustrates still another example of a wireless communication functionality and a plurality of remote lighting devices.

FIG. 9 illustrates one exemplary implementation of the operation of a camera body 905 connected with a wireless communication functionality 910 via a hot shoe connector 915 of camera body 905 and a hot shoe connector 920 of wireless communication functionality 910. Wireless communication functionality 910 is configured as described herein to detect an information related to a shutter speed of camera body 905 via hot shoe connectors 915, 920, to determine a shutter speed based on the information related to a shutter speed, and automatically set a power operating condition of wireless communication functionality based on the shutter speed. In an alternative implementation, a camera body 925 may have a wireless communication functionality 930 connected thereto via a hot shoe connector 935 of camera body 925 and a hot shoe connector 940 of wireless communication functionality 930. Wireless communication functionality 930 also includes an additional hot shoe connector 945 configured to allow connection of a lighting device 950 to camera body 925 via wireless communication functionality 930 and circuitry therein for connecting the contacts of hot shoe connector 945 with hot shoe connector 940. Examples of wireless communication functionalities having hot shoe pass-through (e.g., direct pass-through, indirect pass-through having communications intercepted via a processor) are discussed further below with respect to FIGS. 14 to 16. The following discussions will utilize wireless communication functionality 910 for discussion purposes. It should be noted that another hot shoe wireless communication functionality as described herein, such as a hot shoe bypass wireless communication functionality (e.g., device 930), may also be utilized. Device 930 will be discussed where appropriate to describe relevant functionality of the bypass.

FIG. 9 also illustrates a plurality of remote lighting devices 952, 954, 956, 958, each having a hot shoe connector 962, 964, 966, 968, respectively. Remote lighting devices 952, 954, 956, 958 are each associated with a corresponding wireless communication functionality 972, 974, 976, 978. Wireless communication functionality 972, 974, 976, 978 each have a hot shoe connector 982, 984, 986, 988, respectively. Hot shoe connectors 962, 964, 966, 968 are configured for connecting to hot shoe connectors 982, 984, 986, 988, respectively. In one example, wireless communication functionality 972, 974, 976, 978 are each configured to communicate with the corresponding lighting device 952, 954, 956, 958 via the hot shoe connectors to receive from the corresponding lighting device one or more flash data for wireless communication (e.g., using a wireless communication circuitry, a control circuitry, an antenna, etc.) to wireless communication functionality 910 and/or 930. Although shown as connectable via hot shoe connection, each of lighting devices 952, 954, 956, 958 and corresponding wireless communication functionality 972, 974, 976, 978 may be connected in a different manner (e.g., via the wireless communication functionality of one or more of wireless communication functionality 972, 974, 976, 978 being internal to corresponding ones of lighting devices 952, 954, 956, 958; by another type of external connection). It should also be noted that a wireless communication functionality connected to a hot shoe connector of a camera body may also be utilized to communicate wirelessly to and/or from one or more other remote devices other than a lighting device (e.g., a remote camera, a remote light metering device, a remote color metering device).

It is noted that although FIG. 9 illustrates four remote lighting devices, any number of one or more lighting devices may be communicated to/from utilizing a wireless communication functionality as discussed herein (e.g., devices 910, 930). Lighting devices as discussed herein may include any of a variety of lighting devices. Example lighting devices include, but are not limited to, a flash device (e.g., a studio flash pack, a speedlight), a continuous lighting device (e.g., a modeling light, a continuous studio light), and any combinations thereof.

Wireless communication with a plurality of remote devices may occur in a variety of ways. In one example, communication to each remote device may occur on a different wireless communication channel. In another example, two or more remote devices may share a channel. In one such example, multiple sets of remote devices sharing channels may exist. In another such example, a single set of two or more remote devices share a channel. In yet another example, a wireless communication may utilize addressing to control communication with multiple remote devices (e.g., assigning a unique address to each remote device, assigning a unique address to sets of remote devices). In still another example, communication to each remote device or each set of remote devices may occur substantially simultaneously. In still yet another example, communication to each remote device or each set of remote devices may occur sequentially.

Referring again to FIG. 9, in one exemplary implementation, wireless communication functionality 910 is configured to respond to requests for data from camera body 905 made via data contacts of hot shoe connectors 915, 920 with responses that include flash data from one or more of remote lighting devices 952, 954, 956, 958 (e.g., responses of flash data that mimic a lighting device connected to hot shoe connector 915). In one example, camera body 905 may expect to receive in response to its request flash data corresponding to a local flash device connected to its hot shoe connector. Where there is no flash device connected to the hot shoe connector (e.g., wireless communication functionality 910 in hot shoe connector 915) there is no local flash data to respond. In one exemplary aspect, camera body 905 may stop communication via data contacts of hot shoe connector 915 if a lighting device that communicates appropriate SPI-type data is not connected to hot shoe connector 915 or does not respond appropriately. As stated before a wireless communication functionality, such as device 910, can be used in place of that lighting device to maintain hot shoe communication from the camera body (e.g., by using actual flash data from one or more remote devices to substitute for the flash data requested by the camera body). In one example, the communication obtained by a wireless communication functionality (e.g., device 910, 930) with the camera body is used to obtain data elements to be used by local and/or remote lighting devices for lighting control.

In one example, camera body 905 upon wakeup (e.g., flash/wireless communication device insertion in hot shoe connector, power on, half-press of trigger, full-press of trigger) provides voltage to one or more of the data contacts and/or synchronization contact of hot shoe connector 915. After a period of time (e.g., several milliseconds), the camera initiates an initial data communication via the data contacts of the hot shoe connector. In this example, a wireless communication functionality capable of mimicking a lighting device is connected to the camera hot shoe (e.g., as in camera body 905 and wireless communication functionality 910). The initial data exchange between the camera body and wireless communication functionality may include one or more requests/commands and responses. Exemplary data communication from a camera body during an initial data exchange may include, but is not limited to, a status request for information from the flash device, a model request, a camera mode setting, and any combinations thereof. The wireless communication functionality responds to commands for information from the camera body by providing appropriate data via the data contacts of the hot shoe connector. Examples of data communication provided from a wireless communication functionality to a camera body at the initial round of data exchange include, but are not limited to, ready status, compatibility, dynamic power range, mode of operation, and any combinations thereof. In one example, the data provided to the camera body is a flash data. In one such example, the data is a flash data that has been retrieved (and/or updated) from a remote lighting device. In another such example, the data is a flash data that is a default value that is known to be responsive to the request, but that may not necessarily have been retrieved as actual flash data of one or more remote lighting devices. A default value may be stored in a memory and a control circuitry associates the default value with the request (e.g., when there is no actual value available).

After the initial exchange of data, a period of time may elapse before an additional exchange of data occurs via the hot shoe connector. In one example, if image acquisition does not occur and the camera does not go into a sleep mode (e.g., power off, power down), an additional round of hot shoe data communication may occur between the camera body and the wireless communication functionality. In another example, one or more additional rounds of hot shoe data communication between the camera body and the wireless communication functionality may occur repeating (e.g., with a period of time between each round) until image acquisition sequence or a sleep status is initiated. In one exemplary aspect, each round of data exchange may serve to update information obtained in an initial data exchange or a previous iteration of the one or more additional rounds of data exchange (e.g., update a shutter speed, update an aperture value, update flash ready status), communicate additional information not exchanged in an initial data exchange, update exposure compensation, and any combinations thereof. In another exemplary aspect, additional rounds of data exchange may optionally not include requests for certain information to/from a camera body and/or wireless communication functionality (e.g., if such information is unlikely to be modified, such as camera model information and flash device model information) that may have been made in an earlier round.

In one exemplary implementation, one or more data elements to be provided to a camera body from a wireless communication functionality via one or more data contacts of a hot shoe is actual data from a remote lighting device not connected to the hot shoe connector of the camera body. In one such example, the wireless communication functionality utilizes wireless communication to retrieve the one or more actual data elements from the one or more remote lighting devices. For example, referring again to FIG. 9, camera body 905 makes a request for information related to a lighting device to be controlled using information provided via a hot shoe 915/1320 communication. Wireless communication functionality 910 wirelessly communicates to one or more of wireless communication functionalities 972, 974, 976, 978 requesting the information. The corresponding wireless communication functionality communicates with the corresponding remote lighting device 952, 954, 956, 958 to obtain the information. The one or more of the wireless communication functionalities communicate the information wirelessly to wireless communication functionality 910.

Wireless communication with a plurality of remote devices may occur in a variety of ways. In one example, communication to each remote device may occur on a different wireless communication channel. In another example, two or more remote devices may share a channel. In one such example, multiple sets of remote devices sharing channels may exist. In another such example, a single set of two or more remote devices share a channel. In yet another example, a wireless communication may utilize addressing to control communication with multiple remote devices (e.g., assigning a unique address to each remote device, assigning a unique address to sets of remote devices). In still another example, communication to each remote device or each set of remote devices may occur substantially simultaneously. In still yet another example, communication to each remote device or each set of remote devices may occur sequentially.

The timing of retrieval of actual data values from one or more remote lighting devices may occur at one or more of a variety of times with respect to a communication from a camera body. Examples of such timing include, but are not limited to, wireless retrieval of the information from a remote lighting device at a time other than when the camera body requests the information, retrieval at substantially the same time as the request (e.g., in real time), retrieval at a time prior to the request, retrieval at a time after an initial request and prior to a subsequent request, retrieval during a power-on/wake status cycle prior to the request, retrieval between a wake up status indicator and an initial burst of communication from a camera body, retrieval during the time between bursts of data communication between a camera body and a wireless communication functionality, and any combinations thereof. In one example, a request is made from a camera body, the wireless communication functionality immediately requests the actual data value from one or more lighting devices (e.g., local, remote), the lighting device returns the information, and the wireless communication functionality communicates the data to the camera body via one or more contacts of the hot shoe connector. In certain situations (e.g., certain camera configurations and/or communications protocols), such immediate retrieval and communication may not be possible fast enough to satisfy the requirements of the camera body. In one such example situation, the camera body may discontinue hot shoe communications (e.g., determining that a lighting device/a wireless communication functionality mimicking a lighting device is not connected to the hot shoe) if the camera body does not receive a proper return communication from the wireless communication functionality in the hot shoe.

A wireless communication functionality may be configured with a memory for storing information related to the operation of the wireless communication functionality. Examples of a memory include, but are not limited to, a random access memory (RAM), a flash memory, a disk drive, and any combinations thereof. Examples of information that may be stored in a memory include, but are not limited to, actual flash data from one or more remote lighting devices, default flash, other data, instructions for operating the wireless communication functionality, and any combinations thereof. In one example, a memory may store actual flash data related to one or more lighting devices that is retrieved wirelessly utilizing a wireless communication circuitry of the wireless communication functionality. In such an example, the wireless communication functionality may retrieve one or more data elements from one or more lighting devices, such as at a time between a wake up status indication (e.g., wake from sleep of camera, power on of camera) and an initial data communication from the camera body. In another such example, the wireless communication functionality may retrieve one or more data elements from one or more lighting devices at power on of the wireless communication functionality. In yet another such example, the wireless communication functionality may retrieve one or more data elements from one or more lighting devices after an initial request for data by a camera body. In still another such example, the wireless communication functionality may retrieve one or more data elements from one or more lighting devices between data communication series from a camera body.

In a another exemplary implementation, a wireless communication functionality may wirelessly request updates of data from one or more remote devices for storage in a memory at a rate that is much faster than the rate of iteration of hot shoe communication between a camera body and the wireless communication functionality. In one example, a time between iterations of hot shoe data exchange may be about 30 to about 80 milliseconds. In such an example, wireless communication and retrieval of data from one or more remote devices may be able to occur, for example, in about a few milliseconds per exchange. In one aspect, the memory of the wireless communication functionality may likely have the most recent actual value for one or more data elements requested by a camera body.

In still another exemplary implementation, one or more data elements to be provided to a camera body from a wireless communication functionality via one or more data contacts of a hot shoe is a value known by the wireless communication functionality. A value known by a wireless communication functionality may be stored in a memory of the wireless communication functionality (e.g., until used, for a set period of time). Such a value may be a default value for a particular flash data FIG. 10 includes exemplary timing plots for one example implementation of wireless communication from a wireless communication functionality to one or more remote devices (third plot from top) and wireless communication from one or more remote devices to a wireless communication functionality (fourth plot from top). In this example, an initial series of data is received from a camera body ("initial burst of data"). If the initial series includes a request for data from related to a lighting device to be controlled and the wireless communication functionality is not configured to retrieve an actual value from a lighting device, a value may be provided in a variety of ways. In one example of a way to provide a value in response to a request where an actual value is not available, a default value may be stored in a memory of the wireless communication functionality. Example sources for a default value include, but are not limited to, a prior retrieved value from one or more lighting devices (e.g., a value stored from a prior power-on/wake status cycle, a value stored after a prior request by the camera body), a default value set by a manufacturer of the wireless communication functionality, a value set using one or more input controls on the wireless communication functionality (e.g., a dial, an LED screen, a button, USB, etc.), and any combinations thereof. In another example of a way to provide a value in response to a request where an actual value is not available. After the initial series is received from the camera body in the current example of FIG. 10, the wireless communication functionality responds with a series of data (e.g., data obtained as discussed above). The plot for wireless communication from the wireless communication functionality illustrates a wireless communication to one or more remote devices during the time of hot shoe inactivity between the initial data exchange and the first iterative data exchange between the camera body and the wireless communication functionality. This wireless communication may request one or more data elements from the one or more remote lighting devices. During this same period of inactivity, a wireless communication occurs from one or more remote devices to the wireless communication functionality with a response to the data request. Thus, in this example, when the camera body makes it's next request for data, the memory of the wireless communication functionality will have an actual value with which to respond. Subsequent periods of activity in this example also illustrate wireless exchanges of data between the wireless communication functionality and one or more remote devices (e.g., to update data, to obtain data requested for a first time in a subsequent data communication from the camera body).

FIG. 10 also illustrates exemplary hot shoe communication between a camera body and a wireless communication functionality during an example of image acquisition. In this example, image acquisition occurs using an example of a TTL process. After full trigger activation (illustrated as a voltage drop on the full trigger line), the camera body communicates a series of data via the hot shoe to the wireless communication functionality to instruct a lighting device to arm for TTL preflash ("arm for preflash"). The wireless communication functionality wirelessly communicates data reflecting the arm for preflash command to one or more lighting devices and/or communicate data to a local lighting device connected to a pass-through hot shoe connector of the wireless communication functionality. The camera body next communicates via the hot shoe a data command for preflash fire ("fire preflash"). The wireless communication functionality wirelessly communicates data reflecting the preflash fire command to one or more lighting devices and/or communicate data to a local lighting device (e.g., lighting device 1350) connected to a pass-through hot shoe connector of the wireless communication functionality. The preflash arming and firing sequence shown in FIG. 10 is simultaneous for the one or more lighting devices (e.g., local and/or remote). Subsequently, the one or more lighting devices fire and a TTL metering process occurs. It is contemplated that a wireless communication functionality may be configured to communicate a TTL preflash arming and firing sequence for each of one or more lighting devices to be controlled and/or sets of one or more lighting devices to be controlled in a sequence. In such an example, metering may be accomplished for each lighting device or set of lighting devices separately. After metering, the camera body communicates via the hot shoe TTL exposure values for adjusting from the metered preflash to the wireless communication functionality. The wireless communication functionality communicates the TTL exposure values to the one or more lighting devices to be controlled. In one example, exposure values are determined and communicated for each of the one or more lighting devices and/or sets of lighting devices. In another example, an exposure value is communicated for all lighting devices. Subsequently, the synchronization signal ("sync signal") of the camera body goes low and is communicated to the wireless communication functionality (e.g., via the center synchronization contact of the hot shoe connector), which in turn communicates the synchronization signal (e.g., via a pass-through hot shoe, via wireless communication) to the one or more light devices to be controlled.

In a further implementation, a wireless communication functionality may wirelessly request updates of data from one or more remote devices for storage in a memory at a rate that is much faster than the rate of iteration of hot shoe communication between a camera body and the wireless communication functionality. In one example, a time between iterations of hot shoe data exchange may be about 30 to about 80 milliseconds. In such an example, wireless communication and retrieval of data from one or more remote devices may be able to occur, for example, in about a few milliseconds per exchange. In one aspect, the memory of the wireless communication functionality may likely have the most recent actual value for one or more data elements requested by a camera body.

In still another exemplary implementation, one or more data elements to be provided to a camera body from a wireless communication functionality via one or more data contacts of a hot shoe is a value known by the wireless communication functionality. A value known by a wireless communication functionality may be stored in a memory of the wireless communication functionality (e.g., until used, for a set period of time).

As discussed above, a wireless communication functionality as disclosed herein may include one or more memory elements (e.g., for storing actual data, default data, other data, instructions for operating the wireless communication functionality, etc.). Examples of a memory include, but are not limited to, a random access memory (RAM), a flash memory, a disk drive, and any combinations thereof.

FIG. 10 illustrates several exemplary aspects of various implementations of an information exchange via data connectors of a hot shoe connector. FIG. 10 includes a first timing plot (A) for data communicated from a camera body (e.g., body 905) to a wireless communication functionality (e.g., device 910) via a hot shoe connector on one or more data contacts. The plot begins with a wake up indication. A wake status may occur for a camera body in various situations. Examples of such situations include, but are not limited to, half-press of a trigger (e.g., when camera is in a sleep status), full-press of a trigger button (note the timing plots of FIG. 10 include a full-press trigger later in time), power-on, insertion of wireless communications functionality into camera hot shoe, and any combinations thereof. In this example, a wake status is indicated by a rise in voltage on one or more of the hot shoe's data contacts (e.g., one or more of the data contacts of hot shoe connector 915). After a period of time an initial series of data communications is communicated out from the camera body to the wireless communication functionality via the hot shoe begins ("initial burst of data"). In one example, such an initial series may request identification and/or status information related to one or more lighting devices (e.g., attempting to request flash data for a local flash device) and/or provide status and/or identification information about the camera body. FIG. 10 also includes a second timing plot (B) for data communicated from the wireless communication functionality to the camera body via one or more data contacts of the hot shoe. In response to the initiation of the initial series of data from the camera body, a series of data is communicated via one or more of the data contacts to the camera body from the wireless communication functionality (shown on line (B)). In one example, this response includes flash data. In another example, this response includes actual flash data from one or more remote flash devices.

The one or more data contacts may handle data communicated in and out of the camera body from/to the wireless communication functionality in a variety of ways. Such handling may depend on the configuration and/or protocol of communication for a particular camera body (e.g., different models and/or manufacturers may utilize differing communications protocols). In one example, for every bit of data communicated out from the camera, a bit of data is communicated back from the wireless communication device. In such an example, data is flowing in and out via the hot shoe simultaneously (e.g., in a full duplex fashion). In one example, one or more blank value bits may be returned from a wireless communication device while a camera body is communicating initial bits of information. In one such example, a first contact is used as input and a second contact is used for output from the camera body. In another example, a byte of data is communicated out from the camera and then a byte of data is communicated back from the wireless communication device. In one such example, one contact may be utilized for input and output communications with the camera body. FIG. 10 illustrates data from the wireless communication device to the camera body occurring at a different time from data from the camera body to the wireless communication device.

Referring again to the first (A) and second (B) timing plots of FIG. 10, after another period of time a subsequent series of data communication from the camera body to the wireless communication functionality initiates ("$1^{st}$ iterative burst"). In response, data from the wireless communication functionality is communicated via the hot shoe to the camera body (see line (B)). Again, this data communication to the camera body may include one or more flash data (e.g., from a remote flash device). In the example shown, the time delay period and iterative series of data exchange repeat two more times before an image acquisition trigger occurs. In one example, such repetition may occur until a trigger occurs or a sleep status of the camera body is initiated (e.g., where a user of the camera body has half-pressed the trigger to activate one or more sensors of the camera and holds the half press). In such an example, one or more settings and/or status of the camera may be modified during the iterations such that a subsequent iteration communicates such data to the wireless communication device (which may communicate it to one or more lighting devices). The "full trigger" timing plot (E) indicates that after the third iteration of the subsequent data exchange between the camera body and the wireless communication device in this example, trigger voltage goes low and initiates an image acquisition.

FIG. 10 also includes exemplary timing plots for one example implementation of wireless communication from a wireless communication functionality to one or more remote devices (C) and wireless communication from one or more remote devices to a wireless communication functionality (D). In this example, an initial series of data is received from a camera body ("initial burst of data"). In one example, if the initial series includes a request for data from a lighting device to be controlled and the wireless communication functionality is not configured to retrieve an actual value from a lighting device in real time, a value (e.g., an actual value, a default value) may be provided in a variety of ways. In one example of a way to provide a value in response to a request where an actual value is not available, a default value may be stored in a memory of the wireless communication device. Example sources for a default value include, but are not limited to, a prior retrieved value from one or more lighting devices (e.g., a value stored from a prior power-on/wake status cycle, a value stored after a prior request by the camera body), a default value set by a manufacturer of the wireless communication device, a value set using one or more input controls on the wireless communication device (e.g., a dial, an LED screen, a button, etc.), and any combinations thereof.

After the initial series is received from the camera body in the current example of FIG. 10, the wireless communication functionality responds with a series of data (e.g., flash data obtained as discussed above). The plot (D) for wireless communication from the wireless communication functionality illustrates a wireless communication to one or more remote devices during the time of hot shoe inactivity between the initial data exchange and the first iterative data exchange between the camera body and the wireless communication functionality. This wireless communication may request one or more data elements from the one or more remote lighting devices. During this same period of inactivity, a wireless communication occurs from one or more remote devices to the wireless communication functionality with a response to the data request. Thus, in this example, when the camera body makes it's next request for data, the memory of the wireless communication functionality will have an actual value with which to respond. Subsequent periods of activity in this example also illustrate wireless exchanges of data between the wireless communication functionality and one or more remote devices (e.g., to update data, to obtain data requested for a first time in a subsequent data communication from the camera body).

FIG. 10 also illustrates exemplary hot shoe communication between a camera body and a wireless communication functionality during an example of image acquisition. In this example, image acquisition occurs using an example of a TTL process. After full trigger activation (illustrated as a voltage drop on the full trigger line), the camera body communicates a series of data via the hot shoe to the wireless communication functionality to instruct a lighting device to arm for TTL preflash ("arm for preflash"). The wireless communication functionality wirelessly communicates data reflecting the arm for preflash command to one or more lighting devices and/or communicate data to a local lighting device (e.g., lighting device 450) connected to a pass-through hot shoe connector of the wireless communication functionality. The camera body next communicates via the hot shoe a data command for preflash fire ("fire preflash"). The wireless communication functionality wirelessly communicates data reflecting the preflash fire command to one or more lighting devices and/or communicate data to a local lighting device (e.g., lighting device 450) connected to a pass-through hot shoe connector of the wireless communication functionality. The preflash arming and firing sequence shown in FIG. 10 is simultaneous for the one or more lighting devices (e.g., local and/or remote). Subsequently, the one or more lighting devices fire and a TTL metering process occurs. It is contemplated that a wireless communication functionality may be configured to communicate a TTL preflash arming and firing sequence for each of one or more lighting devices to be controlled and/or sets of one or more lighting devices to be controlled in a sequence. In such an example, metering may be accomplished for each lighting device or set of lighting devices separately. After metering, the camera body communicates via the hot shoe TTL exposure values for adjusting from the metered preflash to the wireless communication functionality. The wireless communication functionality communicates the TTL exposure values to the one or more lighting devices to be controlled. In one example, exposure values are determined and communicated for each of the one or more lighting devices and/or sets of lighting devices. In another example, an exposure value is communicated for all lighting devices. Subsequently, the synchronization signal ("sync signal") of the camera body goes low and is communicated to the wireless communication functionality (e.g., via the center synchronization contact of the hot shoe connector), which in turn communicates the sync signal (e.g., via a pass-through hot shoe, via wireless communication) to the one or more light devices to be controlled.

As discussed above, in one exemplary implementation, information representing a shutter speed of a camera may include a synchronization signal. A synchronization signal ("synch signal") typically provides synchronization of a device associated with the camera (e.g., a flash device) with image acquisition by the camera. This signal is provided by the camera via a synchronization connector of the camera (e.g., a synchronization connector of a hot shoe, a PC connector, other synchronization connector, etc.). It has been determined that the length of a synch signal correlates to a particular shutter speed of a camera. This correlation may differ from one camera to another, but for many camera makes and models the correlation is consistently predictable.

Figure 11:
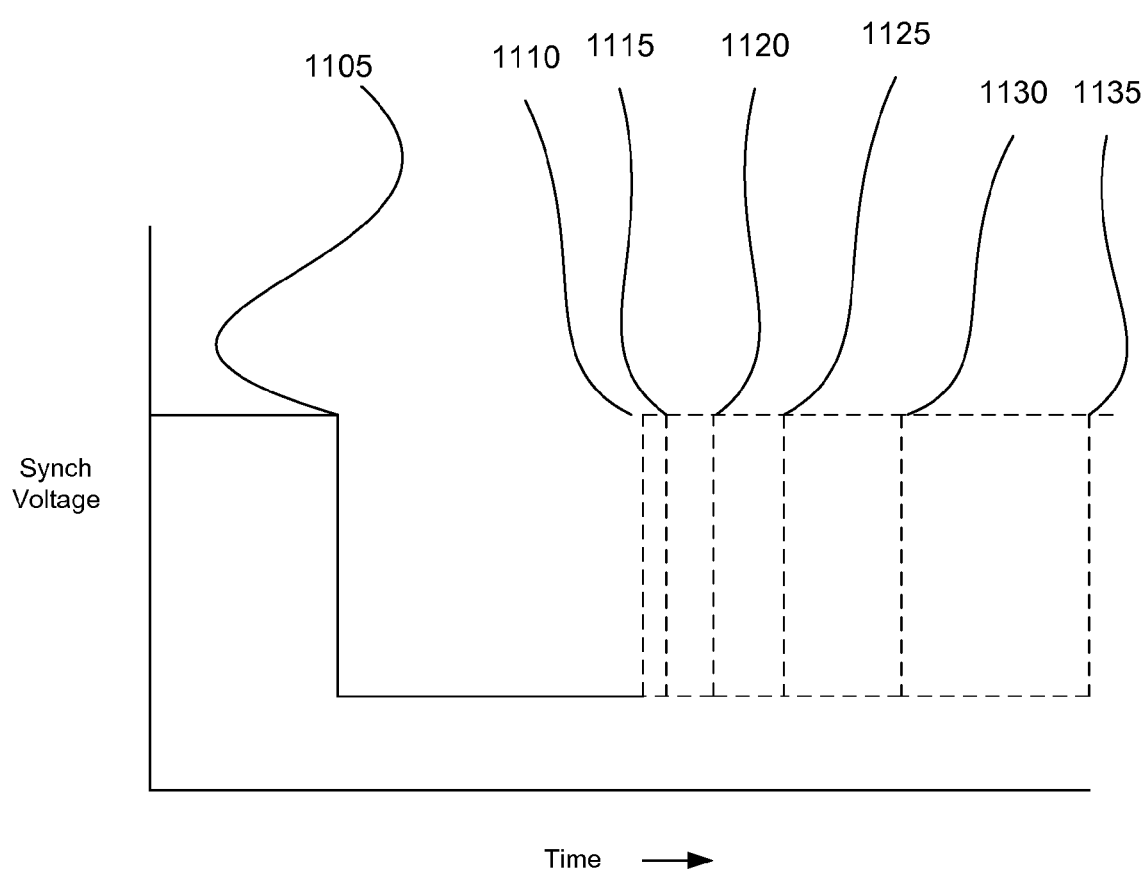
FIG. 11 illustrates one example of a plot of exemplary synchronization signals.

FIG. 11 illustrates an indication of a plot of one exemplary synchronization signal over time. At point 1105, the synch signal drops from high voltage to low voltage indicating a particular point in image acquisition, typically (but not always) the beginning of image acquisition (e.g., the shutter is open). The various dotted lines of the synch signal plot indicate the end of the synch signal (e.g., voltage going high) for synch signals associated with various settings of shutter speed of the camera. Point 1110 indicates the end of a synch signal for the camera set at a shutter speed of $1/10,000^{th}$ of a second. Point 1115 indicates the end of a synch signal for the camera set at a shutter speed of $1/1,000^{th}$ of a second. Point 1120 indicates the end of a synch signal for the camera set at a shutter speed of $1/500^{th}$ of a second. Point 1125 indicates the end of a synch signal for the camera set at a shutter speed of $1/250^{th}$ of a second. Point 1130 indicates the end of a synch signal for the camera set at a shutter speed of $1/125^{th}$ of a second. Point 1135 indicates the end of a synch signal for the camera set at a shutter speed of $1/60^{th}$ of a second. In one example, measurements of the length of synch signals at various shutter speeds for a particular camera model may be made and used by a wireless communication functionality of the present disclosure to determine a shutter speed of a camera of that model for which the wireless communication functionality is associated. Such measurements may be taken for a variety of camera models and stored in association with a wireless communication functionality. In one example, measurements are taken prior to manufacturing of a wireless communication functionality and are stored prior to sale. In another example, measurements are taken by an end user having associated a wireless communication functionality with a particular camera and sending synchronization signals to the wireless communication functionality for given shutter speeds. In such an example, the "training" of the wireless communication functionality may be stored in an associated memory and used by the wireless communication functionality to determine a shutter speed during actual use.

Figure 12:
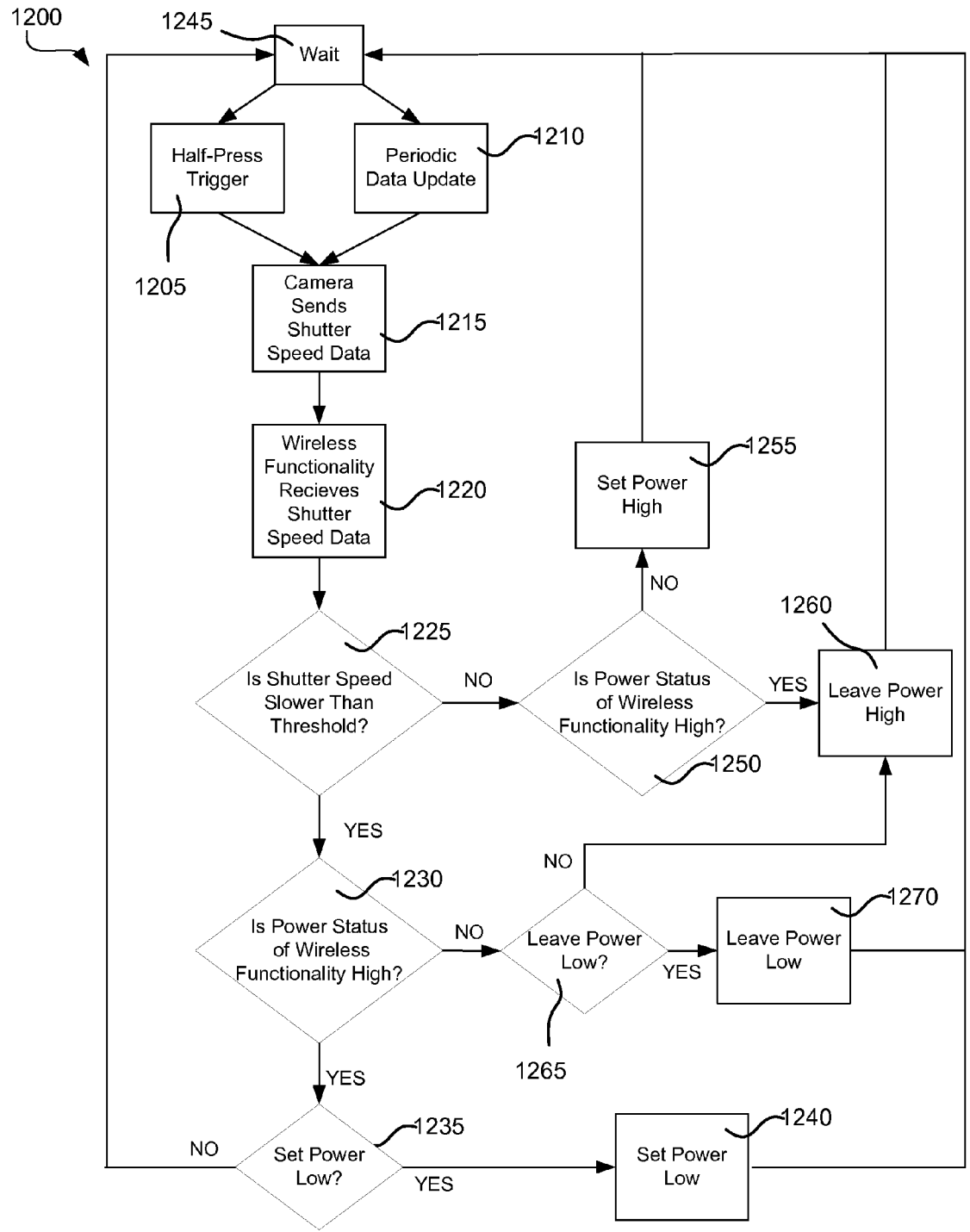
FIG. 12 illustrates another exemplary implementation of a method for setting a power operating condition of a wireless communication functionality.

FIG. 12 illustrates one exemplary implementation of a method 1200 of setting a power operating condition of a wireless communication functionality (e.g., wireless communication functionality 205, 305, 500, 605, 810, 830, 1005, 1100) based on the shutter speed of a camera body (e.g., detected via a synchronization connector of the camera body). In this exemplary implementation, the wireless communication functionality includes two power operating levels: a high power operating level (e.g., one at which the wireless communication circuitry of the wireless communication functionality is at a high power level for rapid operation) and a low power operating level (e.g., one at which the wireless communication circuitry is at a low power level for power conservation, but at which the wireless communication circuitry may require time to power-up to a state capable of transmitting wirelessly). It is contemplated that a wireless communication functionality may have any number of different power operating levels. One or more thresholds may correlate one or more shutter speeds with each of the different power operating levels.

A camera body may send shutter speed data via one or more connections (e.g., contacts) of a synchronization connector at various times in the operation of the camera body. In one example, shutter speed data is sent by a camera (e.g., via a hot shoe connector or other synchronization connector) when a user of the camera half-depresses the trigger. In another example, shutter speed data is sent by a camera automatically intermittently via one or more contacts of a synchronization connector (e.g., SPI-type information may be sent to a flash connected to a hot shoe of a camera intermittently to update the flash of the status of the camera). At step 1205, a half-press trigger occurs at the camera body. In another example, at step 1210, a periodic update of shutter speed data may occur. At step 1215, the camera body communicates a shutter speed data via an external connector of a camera body. At step 1220, a wireless communication functionality connected to the external connector receives (e.g., detects) the shutter speed data. At step 1225, a determination is made whether the shutter speed represented by the shutter speed data is below a threshold. If the shutter speed is below the threshold, at step 1230, a determination is made whether the power operating condition of the wireless communication functionality is set to the high power operating condition. If the power operating condition is set to the high power operating condition, at optional step 1235, a determination can be automatically made (e.g., based on predetermined criteria, such as power conservation demands) whether the operating condition should be set to the low power operating condition. If the determination at step 1235 is affirmative, at step 1240, the power operating condition is set to the low operating condition. If the determination at step 1235 is negative, method 1200 proceeds to stage 1245 to wait for a half-press trigger (or other camera wake-up indication) at step 1205 or for a periodic update of the serial shutter speed data at step 1210. If the step 1235 is not included in method 1200, method 1200 proceeds to step 1240 and then to stage 1245.

If at step 1225, the shutter speed is not below the threshold, a determination is made at step 1250 if the power operating condition of the wireless communication functionality is at the high power operating condition. If the determination at step 1250 is affirmative, the power operating condition is left at the high power operating condition at step 1255 and method 1200 proceeds to stage 1245. If the determination at step 1250 is negative, the power operating condition is set to the high power operating condition at step 1260 and method 1200 proceeds to stage 1245.

If at step 1230, the determination is that the power operating condition is set to the low power operating condition, a determination can be automatically made at optional step 1265 whether to leave the power operating condition low (e.g., based on predetermined criteria, such as power conservation demands). If the determination at step 1265 is affirmative, the power is left at the low operating condition at step 1270 and method 1200 proceeds to stage 1245. If the determination at step 1265 is negative, the power operating condition is set to the high power operating condition at step 1260 and method 1200 proceeds to stage 1245. If optional step 1265 is not included in method 1200, method 1200 proceeds from a determination at step 1230 that the power operating condition is set to the low power operating condition to step 1270 and method 1200 proceeds to stage 1245.

Figure 13:
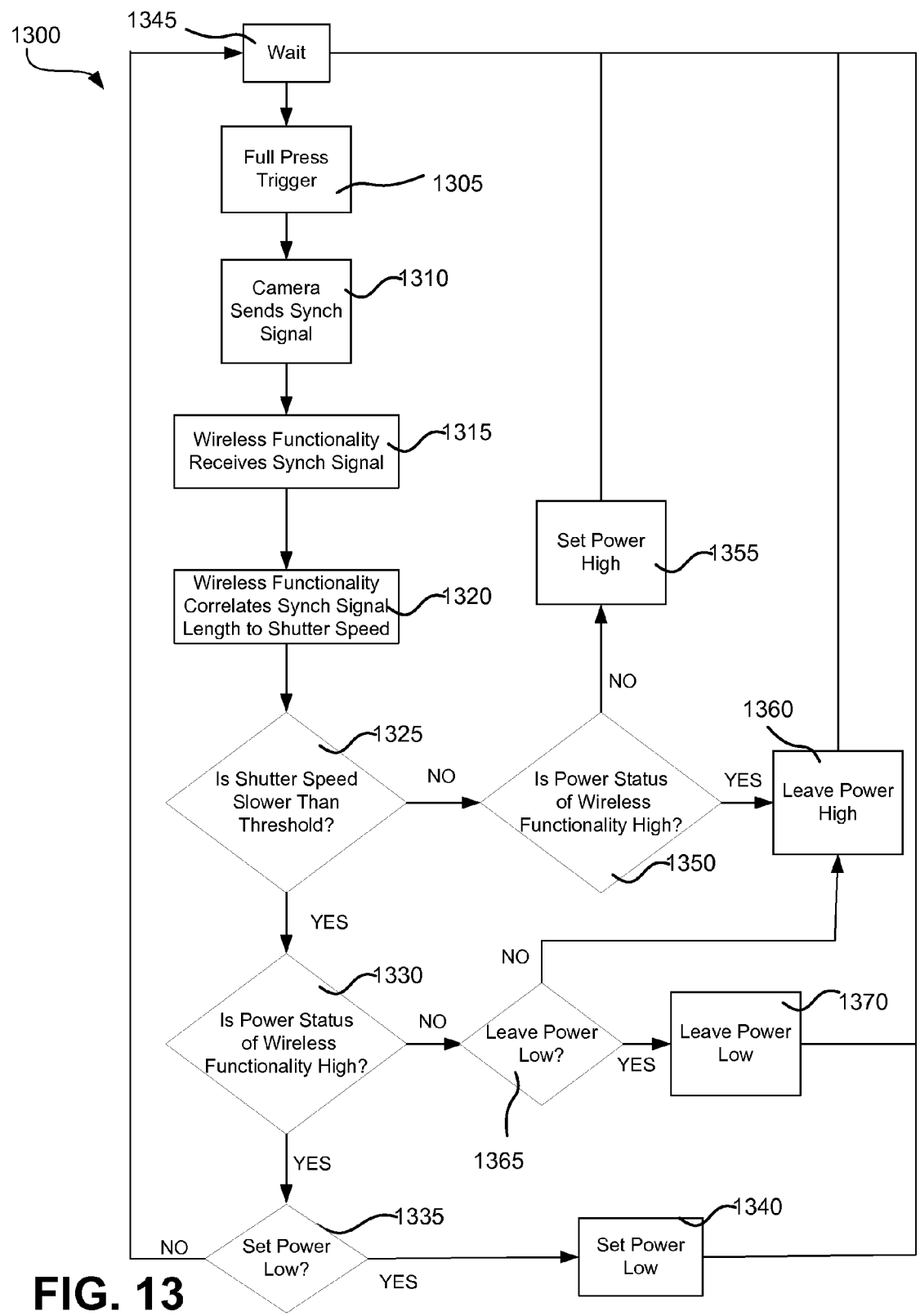
FIG. 13 illustrates yet another exemplary implementation of a method for setting a power operating condition of a wireless communication functionality.

FIG. 13 illustrates one exemplary implementation of a method 1300 of setting a power operating condition of a wireless communication functionality (e.g., wireless communication functionality 205, 305, 500, 605, 810, 830, 1005, 1100) based on the shutter speed of a camera body (e.g., detected via a synchronization connector of the camera body and determined based on the length of duration of a synchronization signal from the camera body). In this exemplary implementation, the shutter speed is determined from the synchronization signal itself. Additionally, in this exemplary implementation, the wireless communication functionality includes two power operating levels similar to in the exemplary method 1200 of FIG. 12 (i.e., a high power operating level and a low power operating level. It is contemplated that a wireless communication functionality may have any number of different power operating levels. One or more thresholds may correlate one or more shutter speeds with each of the different power operating levels.

At step 1305, a full press trigger or other initiation of image acquisition occurs. At step 1310, as the image acquisition process continues in the camera body, the camera generates a synchronization signal. At step 1315, a wireless communication functionality connected to a synchronization connector of the camera body (e.g., a PC connector, a hot shoe connector) detects the synchronization signal. At step 1320, the wireless communication functionality determines a shutter speed from the length of the synchronization signal.

At step 1325, a determination is made whether the shutter speed represented by the synchronization signal is below a threshold. If the shutter speed is below the threshold, at step 1330, a determination is made whether the power operating condition of the wireless communication functionality is set to the high power operating condition. If the power operating condition is set to the high power operating condition, at optional step 1335, a determination can be automatically made (e.g., based on predetermined criteria, such as power conservation demands) whether the operating condition should be set to the low power operating condition. If the determination at step 1335 is affirmative, at step 1340, the power operating condition is set to the low operating condition. If the determination at step 1335 is negative, method 1300 proceeds to stage 1345 to wait for another initiation of image acquisition at step 1305 (e.g., after which a new synchronization signal that possibly represents an updated shutter speed of the camera body is generated). If the step 1335 is not included in method 1300, method 1300 proceeds to step 1340 and then to stage 1345.

If at step 1325, the shutter speed is not below the threshold, a determination is made at step 1350 if the power operating condition of the wireless communication functionality is at the high power operating condition. If the determination at step 1350 is affirmative, the power operating condition is left at the high power operating condition at step 1355 and method 1300 proceeds to stage 1345. If the determination at step 1350 is negative, the power operating condition is set to the high power operating condition at step 1360 and method 1300 proceeds to stage 1345.

If at step 1330, the determination is that the power operating condition is set to the low power operating condition, a determination can be automatically made at optional step 1365 whether to leave the power operating condition low (e.g., based on predetermined criteria, such as power conservation demands). If the determination at step 1365 is affirmative, the power is left at the low operating condition at step 1370 and method 1300 proceeds to stage 1345. If the determination at step 1365 is negative, the power operating condition is set to the high power operating condition at step 1360 and method 1300 proceeds to stage 1345. If optional step 1365 is not included in method 1300, method 1300 proceeds from a determination at step 1330 that the power operating condition is set to the low power operating condition to step 1370 and method 1300 proceeds to stage 1345.

As discussed above, a wireless communication functionality may include a second hot shoe connector for connecting an accessory device (e.g., a local flash device) via the circuitry of the wireless communication functionality to a hot shoe connector of a camera body.

Figure 14:
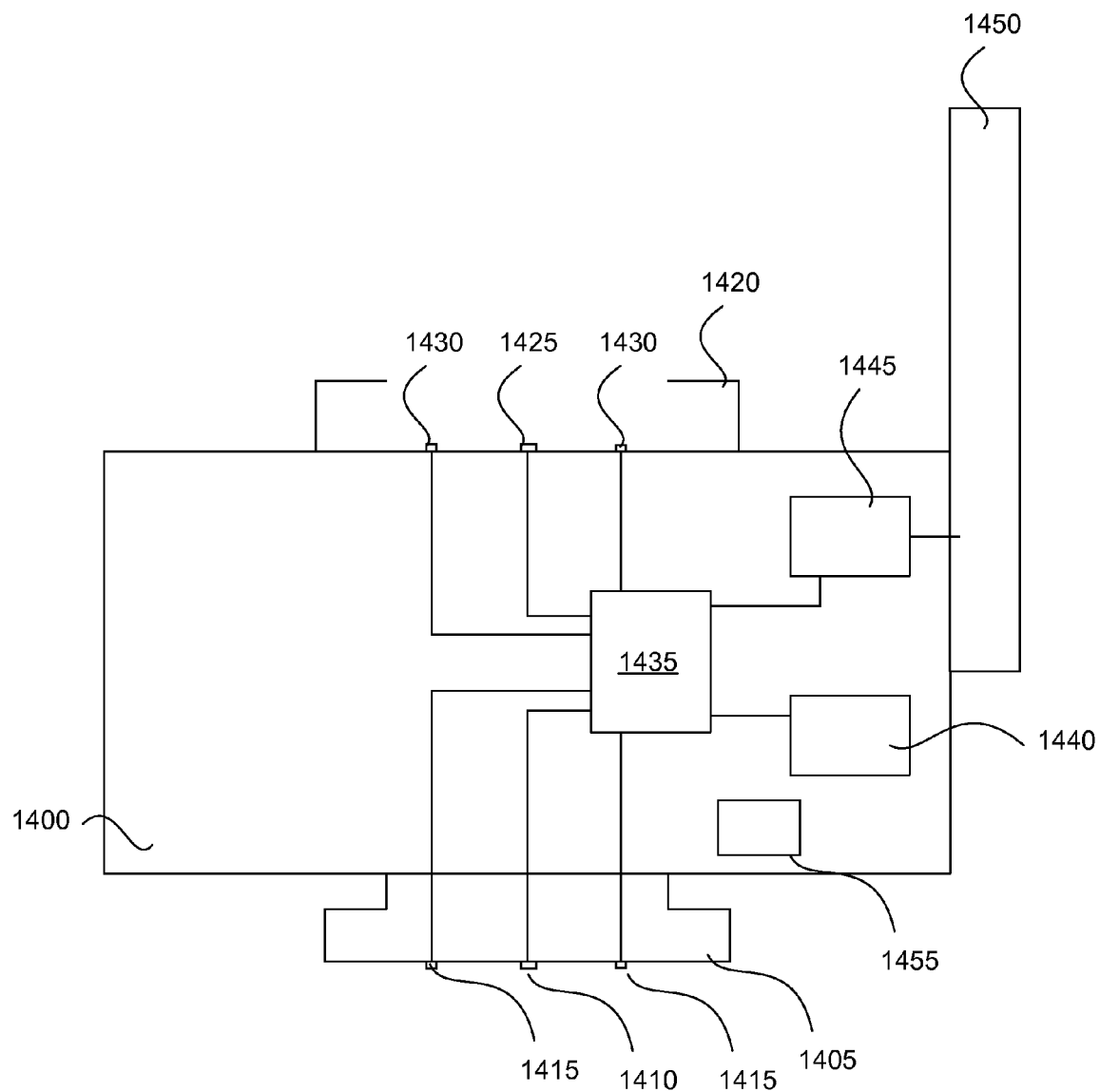
FIG. 14 illustrates one exemplary wireless communication functionality with a pass-through hot shoe connector.

FIG. 14 illustrates an exemplary implementation of a wireless communication functionality 1400 having two hot shoe connectors and a configuration for setting a power operating condition of the wireless communication functionality based on a shutter speed of a camera body to which the wireless communication functionality is connected. Wireless communication functionality 1400 includes a first hot shoe connector 1405. Hot shoe connector 1405 is configured as a male hot shoe connector. Hot shoe connector 1405 includes a center synchronization contact 1410 and a plurality of data contacts 1415. FIG. 14 is shown with two data contacts for convenience of view. It is contemplated that a hot shoe connector may have any number of data contacts. Wireless communication functionality 1400 also includes a second hot shoe connector 1420 (i.e., a pass-through hot shoe connector). Hot shoe connector 1420 is configured as a female hot shoe connector. Hot shoe connector 1420 includes a center synchronization contact 1425 and a plurality of data contacts 1430. Hot shoe connector 1420 is shown with two data contacts for convenience of view. It is contemplated that a hot shoe connector may have any number of data contacts. Also, contacts 1425 and 1430 are shown as raised contact for convenience of view. In another example, contacts 1425 and 1430 are flat surface contacts (e.g., typical female hot shoe contacts).

Wireless communication functionality 1400 includes a control circuitry 1435 (e.g., a processor), a memory 1440, and a wireless communication circuitry 1445 (e.g., a receiver, a transmitter, a transceiver). Control circuitry 1435 controls aspects of the operation of wireless communication functionality 1400 (e.g., data communication via data contacts 1415, 1430, synchronization communication via sync contacts 1410, 1425, wireless communication, intelligence related to determining which data elements to update, detection of an information related to a shutter speed, determination of a shutter speed, setting a power operating condition of wireless communication circuitry 1445). Memory 1440 is electrically connected with control circuitry 1435. Memory 1440 may include machine executable instructions that may be executed by control circuitry 1435 consistent with one or more aspects and/or embodiments of the disclosure herein. Memory 1440 may also include stored data related to one or more lighting devices, shutter speed correlation (e.g., with length of synchronization signals), and/or other elements of communication via hot shoe connectors 1405, 1420. Control circuitry 1435 and memory 1440 are shown as separate elements of device 1400. Memory 1440 may also be part of control circuitry 1435 (e.g., on-chip memory).

Wireless communication circuitry 1445 is connected with an antenna 1450 for wireless communication to and/or from one or more remote devices. Wireless communication circuitry 1445 is connected with control circuitry 1435 for providing wireless communication to and/or from wireless communication functionality 1400. Examples of wireless communication circuitry 1445 include, but are not limited to, a transceiver circuitry, a transmitter circuitry, a receiver circuitry, and any combination thereof. Wireless communication circuitry 1445 is shown as separate from control circuitry 1435. In an alternative implementation, wireless communication circuitry 1445 and control circuitry 1435 may be combined in an integrated circuitry. In another alternative implementation, wireless communication circuitry 1445 may include a processing capability in addition to control circuitry 1435. An example of a transceiver circuitry may include a ChipCon CC1110 (by TI) CPU and transceiver all in one chip.

Antenna 1450 is shown as an external antenna. In another example, antenna 1450 may be configured completely within the body of device 1400. In yet another example, antenna 1450 may be removable from device 1400. In still another example, antenna 1450 may be adjustable with respect to its position relative to the body of device 1400.

Wireless communication functionality 1400 also includes a power source 1455 for providing power to one or more of the components of wireless communication functionality 1400.

Processor 1435 is shown with wired connection (e.g., direct, indirect) to contacts 1410, 1415 and wired connection (e.g., direct, indirect) to contacts 1425, 1430 of optional hot shoe connector 1420. In the example shown, contacts of hot shoe connector 1405 and 1420 are connected to control circuitry 1435 and not directly connected to each other. In another example, one or more of corresponding contacts of hot shoe connectors 1405 and 1420 may be wired as direct pass-throughs. Examples of such pass-through are discussed below in with respect to FIGS. 16 and 16. In one such example, one or more direct pass-throughs may be electrically tapped to a connection to control circuitry 1435 so that control circuitry 1435 may control and/or monitor communication via the direct pass-through. In yet another example, control circuitry 1435 controls communication between contacts of hot shoe connector 1405 and hot shoe connector 1420.

Figure 15:
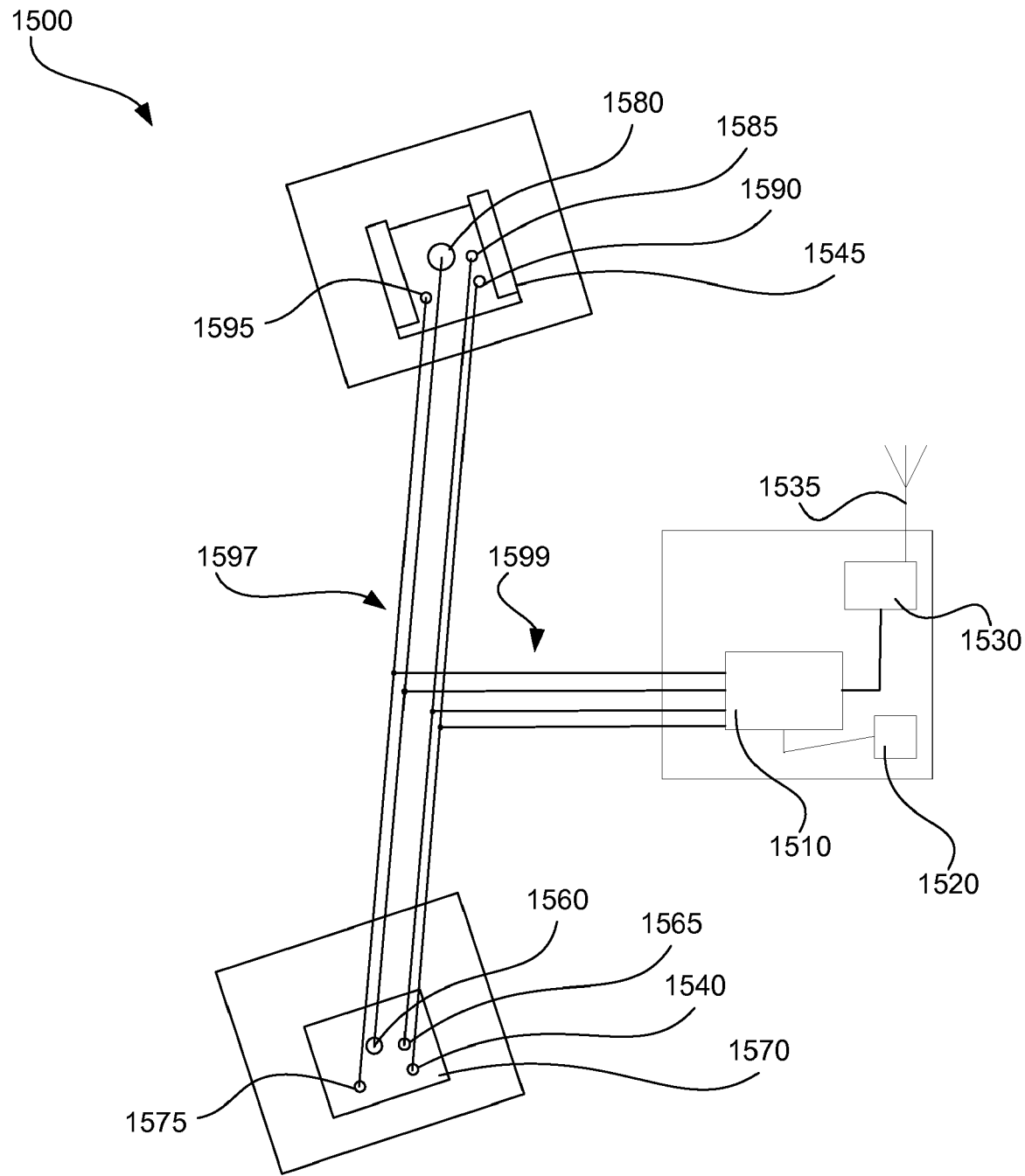
FIG. 15 illustrates another exemplary wireless communication functionality with a pass-through hot shoe connector.

FIG. 15 illustrates electrical connections and internal circuitry of an exemplary wireless communication module 1500 having a pass-through hot shoe connection. Elements of wireless communication module 1500 that are similar to elements of wireless communication functionality discussed above (e.g., wireless communication functionalities with power operation condition set based on shutter speed) have similar functions and configuration as described above except as differently indicated. Module 1500 includes a processor 1510 and a memory 1520. Processor 1510 controls the operation of module 1500 and information that may be communicated wirelessly to and/or from module 1500. Memory 1520 is in electrical communication with processor 1510. Memory 1520 may include machine executable instructions that may be executed by processor 1510 in operating module 1500. Module 1500 includes a wireless communication circuitry 1530 and an antenna 1535 that are in electrical communication with processor 1510.

Module 1500 also includes a hot shoe connector 1540 and a hot shoe connector 1545, each positioned on a body of module 1500. Hot shoe connector 1540 is configured for connection to a hot shoe connector of a camera body. Hot shoe connector 1545 is configured for connection to a hot shoe connector of an accessory device (e.g., a flash device). Hot shoe connector 1540 includes a center synch contact 1560 and three additional contacts 1565, 1570, 1575. Hot shoe connector 1545 includes a center synch contact 1580 and three additional contacts 1585, 1590, and 1595. It is contemplated that alternative hot shoe configurations may be used that have any number of one or more contacts. Contacts 1560, 1565, 1570, and 1575 are connected to contacts 1580, 1585, 1590, and 1595, respectively, by electrical connections 1597. Electrical connections 1597 are configured to allow information from a camera body connected to hot shoe connector 1540 to pass via the appropriate connector channel to the corresponding contact of hot shoe connector 1545. In another example, electrical connections 1597 are configured to allow information from an accessory device connected to hot shoe connector 1545 to pass via the appropriate connector channel to the corresponding contact of hot shoe connector 1540. Exemplary structures for each of electrical connections 1597 include, but are not limited to, a wire, a printed circuit board electrical path, spring contact, and any combinations thereof. In one example, one or more data or other signal communicated via electrical connections 1597 may be accessed by processor 1510. In another exemplary aspect, information communication via electrical connections 1597 to and/or from hot shoe connector 1540 to and/or from hot shoe connector 1545 need not pass through processor 1510 for communications between a connected camera body and a connected accessory device.

Module 1500 also includes electrical connections 1599 that provide electrical connection (e.g., a tapping) between electrical connections 1597 and processor 1510. Electrical connections 1599 allow processor 1510 to manage information from a camera body connected to hot shoe connector 1540 and to pass the information (e.g., as raw information and/or after appropriate formatting) to wireless communication circuitry 1530 for wireless communication to a remote device via antenna 1535. In another implementation, where wireless communication circuitry 1530 includes receiver circuitry (e.g., as a separate circuit, as a transceiver), electrical connections 1599 may allow processor 1510 to manage information wirelessly received by module 1500 and to pass the information (e.g., as raw information and/or after appropriate formatting) via electrical connections 1597 to a camera body connected to hot shoe connector 1540.

The connection path including center synch contacts 1560 and 1580 (and a corresponding one of electrical connections 1597) may be utilized to transmit a synchronization signal from the camera body to an attached accessory. The synchronization signal may also be received by processor 1510 via a corresponding one of electrical connections 1599 for wireless communication to one or more remote devices. In alternative embodiments information other than a synchronization signal may be passed using this connection path (e.g., information representing a shutter speed). Additional contacts 1565, 1570, and 1575, and additional contacts 1585, 1590, and 1595 (and corresponding ones of electrical connections 1597) may be configured to pass a variety of different information to and/or from a camera body connected to module 1500. In one example, one connection path may be utilized for a clock signal from an attached camera body. A clock signal may be utilized by an attached accessory and/or a remote device for synchronizing data transfer to/from camera and device. In another example, one or more of the connection paths may be configured for exchange of serial camera and/or flash data (e.g., TTL information).

Referring again to FIG. 15, in certain situations where a local hot shoe flash is connected to the hot shoe connector 1545 it may not be desirable to have the local flash fire. Such situations include, but are not limited to, when using one or more remote flashes and taking an image of a larger scene more appropriately lit by the remote flashes, situations where the glare of the local flash would be inappropriate, such as near a mirror or glass window.

Figure 16:
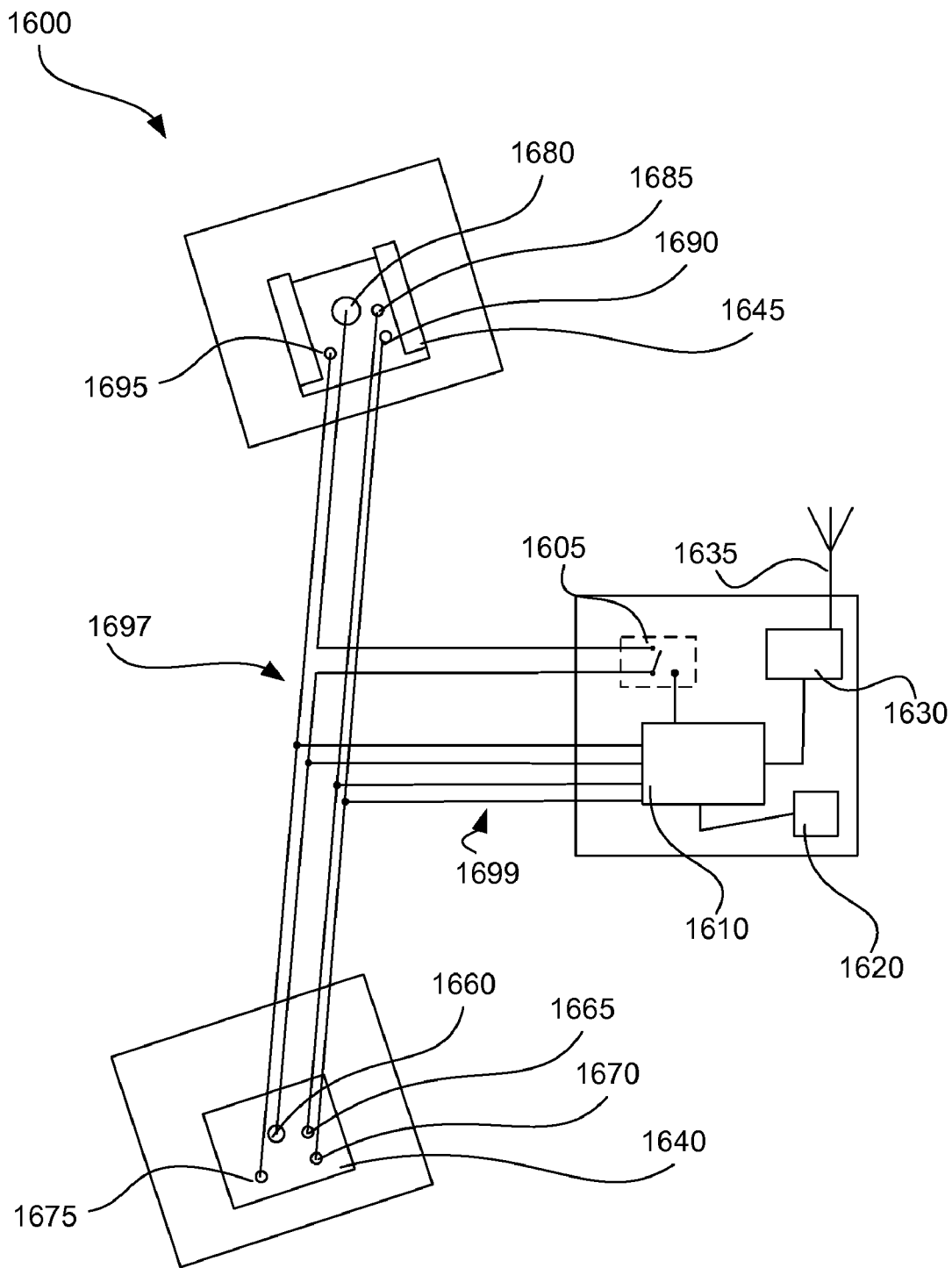
FIG. 16 illustrates yet another exemplary wireless communication functionality with a pass-through hot shoe connector.

FIG. 16 illustrates another embodiment of a wireless communication module 1600. Wireless communication module 1600 is configured similarly to (and has similar functionality as) wireless communication module 1500 of FIG. 5, except as discussed below. Module 1600 includes a hot shoe connector 1640 having contacts 1660, 1665, 1670, 1675 and a hot shoe connector 1645 having contact 1680, 1685, 1690, 1695. Module 1600 also include a control circuit (e.g., processor) 1610, a memory 1620, a wireless communication circuitry 1630, an antenna 1635, and electrical connections 797, 799. Module 1600 includes a switching element 1605. Switching element 1605 is connected to a center synch contact 1660 of a hot shoe connector 1640 via a first electrical connection and connected to a center synch contact 1680 of a hot shoe connector 1645 via a second electrical connection. Switching element 1605 intercepts signals between center synch contacts 1660 and 1680. A processor 1610 controls the operation of switch 1605. Switch 1605 may selectively connect center synch contact 1660 with center synch contact 1680 utilizing control by processor 1610. Processor 1610 remains connected to center synch contact 1660 via one of electrical connections 1699. In one example, a mechanical switching device (e.g., a button, toggle, etc.) on module 1600 may be actuated by a user to set switch 1605 to a desired location. Alternatively, switch 1605 may be controlled directly via a mechanical switch of module 1600 without the control of processor 1610. In another example, a solid state switch 1605 may be controlled via processor 1630 and a mode set by a user (e.g., via a mechanical switch on module 1600) of module 1600. In yet another example, processor 1630 (e.g., in conjunction with instructions stored in a memory 1620) may monitor operating conditions of a camera connected to hot shoe connector 1640 and utilizing the operating conditions set a mode of operation of module 1600 to have switch 1605 selectively connect or disconnect one or more connectors of hot shoe connector 1645 from corresponding one or more connectors of hot shoe connector 1640. In one example, a camera may be programmed to allow a user to set one of a plurality of modes (e.g., using a control, such as a screen and/or button, of the camera) for determining the connectivity of hot shoe connector 1645 to one or more commands or information from the camera. Processor 1610 may detect information from the camera regarding this selected mode and instruct switch 1605 accordingly.

In one example of operation of module 1600, when switch 1605 intercepts (i.e., blocks) a synchronization signal sent by a camera body connected to hot shoe connector 1640, the synchronization signal may be received by processor 1610 for wireless transmission to one or more remote flash devices. In this way, the local flash device connected to hot shoe 1645 will not fire, while the one or more remote flash devices will fire. Similarly, by switching switch 1605 to have the synchronization signal only go to the local hot shoe flash, the one or more remote flash devices will not fire. This may be desirable when taking close-up images of near objects (e.g., where side lighting from one or more remote lighting devices may not be appropriate for the imaging situation).

In an alternative embodiment, switch 1605 may intercept a different or additional one or more communication paths formed by one or more of electrical connections 1697 between connectors of the two hot shoe connectors 1640 and 1645. For example, switch 1605 may be configured to intercept a communication path utilized for a clocking signal. In certain situation (e.g., synchronous serial communication), if a clocking signal is not received by an accessory device connected to hot shoe 1645, the accessory device will not be instructed to act upon other information that is received via one or more of the other additional connectors.

One exemplary advantage of a wireless communication module having a switching element, such as switching element 1605 of module 1600 of FIG. 16, is that an un-powered accessory device connected to a hot shoe of a module may impact the capacitance of one or more communication paths (or other electrical properties) such as to negatively impact signals transmitted. A switched communication path may prevent the capacitance-impact on that communication path. In one example, one or more communication paths may be switched. In another example, all communication paths may be switched.

One exemplary advantage of a wireless communication module with a second hot shoe connector is that wireless communication capability can be provided to a camera body via the hot shoe of the camera body while still allowing the camera body to take advantage of a hot shoe accessory device, such as a local external flash. In another exemplary aspect, such an advantage may be achieved with a wireless module and accessory device affixed directly to the hot shoe of the camera body. In one example, a wireless communication module of the present disclosure may be sized and shaped to add a minimal amount of weight and volume to the size of the camera, even when an accessory device is attached thereto.

In yet another embodiment, a processor (e.g., processor 1610) may be configured to automatically switch one or more communication lines based on information received from a camera body attached to a corresponding hot shoe of the module. In one example, a camera may pass information related to the distance from the camera to an object to be imaged to the processor via the corresponding hot shoe and communication path. The processor (e.g., in combination with information stored in a corresponding memory) may determine that the distance is too far for an attached hot shoe accessory flash to have a reasonable impact on lighting. In such a case, the local flash may be switched off by the processor.

One exemplary advantage of a wireless communication module having a switching element, such as switching element 1605 of module 1600 of FIG. 16, is that an un-powered accessory device connected to a hot shoe of a module may impact the capacitance of one or more communication paths (or other electrical properties) such as to negatively impact signals transmitted. A switched communication path would prevent the capacitance-impact on that communication path. In one example, one or more communication paths may be switched. In another example, all communication paths may be switched.

It is to be noted that the above described aspects and embodiments may be conveniently implemented using a conventional processing device programmed according to the teachings of the present specification, as will be apparent to those skilled in the computer art. Appropriate software coding (i.e., instructions) can readily be prepared by skilled programmers based on the teachings of the present disclosure, as will be apparent to those skilled in the software art.

Such instructions may be included on a machine readable medium (e.g., memory 275 of FIG. 2) including stored computer code which is used to program a processing device to perform the disclosed function and process of the present disclosure. Examples of a machine readable medium include, but are not limited to, a random access memory, a read only memory, a memory drive device, an EPROM, an EEPROM, a compact disc (e.g., read only CD-ROM, writeable CD, re-writable CD, DVD, etc.), a magneto-optical disc and/or card, a flash memory (e.g., a thumb drive), a removable memory (e.g., a memory card, such as an SD-card), and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of managing the power of a photographic wireless communications circuitry associated with a camera body, the camera body having an external connector that provides access to a synchronization signal of the camera body, the method comprising:
    detecting a first shutter speed information from the external connector of the camera body that provides access to a synchronization signal and to the first shutter speed information from within the camera body, the first shutter speed information representing a shutter speed of the camera body;
    determining a shutter speed of the camera body from the first shutter speed information; and
    automatically setting a power operating condition of the photographic wireless communications circuitry based on the shutter speed.

2. A method according to claim 1, wherein said detecting a first shutter speed information includes:
    detecting a serial data communication including data representing a shutter speed of the camera body via the external connector.

3. A method according to claim 1, wherein the external connector is a hot shoe connector of the camera body.

4. A method according to claim 1, further comprising mimicking a photographic flash device connected to a hot shoe connector of the camera body to initiate the camera body communicating the first shutter speed information via the hot shoe connector of the camera body.

5. A method according to claim 1, wherein the external connector is a PC synchronization connector.

6. A method according to claim 1, wherein the first shutter speed information is embodied in the synchronization signal.

7. A method according to claim 6, wherein said determining a shutter speed of the camera body includes:
    detecting a length of duration of the synchronization signal; and
    determining the shutter speed of the camera body from the length of duration of the synchronization signal.

8. A method according to claim 1, wherein said automatically setting a power operating condition includes comparing the shutter speed of the camera body to a threshold stored in a memory associated with the photographic wireless communications circuitry.

9. A method according to claim 8, wherein said automatically setting a power operating condition further comprises:
    setting the power operating condition to a first operating condition when the shutter speed of the camera body is above the threshold; and
    setting the power operating condition to a second operating condition when the shutter speed of the camera body is below the threshold, wherein the second operating condition utilizes less power than the first operating condition.

10. A method of managing the power of a photographic wireless communications circuitry associated with a camera body, the camera body having an external connector that provides access to a synchronization signal of the camera body, the method comprising:
    detecting a synchronization signal via an external connector of a camera body;
    determining a shutter speed of the camera body from a length of the duration of the synchronization signal; and
    automatically setting a power operating condition of the photographic wireless communications circuitry based on the shutter speed.

11. A method according to claim 10, wherein said automatically setting a power operating condition includes comparing the shutter speed of the camera body to a threshold stored in a memory associated with the photographic wireless communications circuitry.

12. A method according to claim 10, wherein said automatically setting a power operating condition further comprises:
   setting the power operating condition to a first operating condition when the shutter speed of the camera body is above the threshold; and
   setting the power operating condition to a second operating condition when the shutter speed of the camera body is below the threshold, wherein the second operating condition utilizes less power than the first operating condition.

13. A method according to claim 10, wherein the external connector is a hot shoe connector of the camera body.

14. A method according to claim 10, wherein the external connector is a PC synchronization connector.

15. A photographic wireless communication device for providing wireless communication capability to a camera body having an external connector that provides access to a synchronization signal of the camera body, the photographic wireless communication device comprising:
   a wireless communications circuitry;
   a first connector configured to connect to an external connector of the camera body that provides access to a synchronization signal of the camera body; and
   a power operating condition control circuitry connected to the first connector and configured to receive from the first connector a first shutter speed information, the first shutter speed information representing a shutter speed of the camera body, said power operating condition control circuitry for determining a shutter speed of the camera body and automatically setting a power operating condition of the wireless communications circuitry based on the shutter speed.

16. A photographic wireless communication device according to claim 15, wherein said first connector is a hot shoe connector.

17. A photographic wireless communication device according to claim 15, wherein said first connector is a PC synchronization connector.

18. A photographic wireless communication device according to claim 15, further comprising a memory in electrical communication with said power operating condition control circuitry, the memory including data correlating a length of a synchronization signal to a shutter speed of a camera.

19. A photographic wireless communication device according to claim 15, wherein said power operating condition control circuitry includes a means for determining the shutter speed from a synchronization signal accessed via the external connector of the camera body.

20. A photographic wireless communication device according to claim 15, wherein the photographic wireless communication device does not include a light emitting element and said power operating condition control circuitry includes a means for mimicking one or more communications of a photographic flash device connected to the external connector of the camera body.

* * * * *